(12) United States Patent
Kato

(10) Patent No.: US 10,896,499 B2
(45) Date of Patent: *Jan. 19, 2021

(54) IMAGE PROCESSING SYSTEM, IMAGE PROCESSING DEVICE AND IMAGE PROCESSING PROGRAM

(71) Applicant: OMRON Corporation, Kyoto (JP)

(72) Inventor: Yutaka Kato, Kyoto (JP)

(73) Assignee: OMRON Corporation, Kyoto (JP)

( * ) Notice: Subject to any disclaimer, the term of this patent is extended or adjusted under 35 U.S.C. 154(b) by 76 days.

This patent is subject to a terminal disclaimer.

(21) Appl. No.: 16/278,154

(22) Filed: Feb. 17, 2019

(65) Prior Publication Data

US 2019/0287236 A1    Sep. 19, 2019

(30) Foreign Application Priority Data

Mar. 15, 2018 (JP) .................................. 2018-047628

(51) Int. Cl.
   *G06T 7/00* (2017.01)
   *G06T 7/70* (2017.01)
   *G06K 9/46* (2006.01)
   *G06K 9/20* (2006.01)

(52) U.S. Cl.
   CPC .......... *G06T 7/0004* (2013.01); *G06K 9/2027* (2013.01); *G06K 9/4661* (2013.01); *G06T 7/70* (2017.01); *G06K 2209/19* (2013.01); *G06T 2207/10152* (2013.01); *G06T 2207/30164* (2013.01)

(58) Field of Classification Search
   CPC .................................. G06T 7/0004; G06T 7/70
   See application file for complete search history.

(56) References Cited

U.S. PATENT DOCUMENTS

2015/0355102 A1* 12/2015 Kido .................. G01N 21/8806
                                                         348/46
2015/0355104 A1* 12/2015 Matsuda ............ G01N 21/8851
                                                         356/237.2

FOREIGN PATENT DOCUMENTS

| CN | 1874418   | 12/2006 |
| CN | 104735361 | 6/2015  |
| JP | 2015232487 | 12/2015 |

OTHER PUBLICATIONS

"Search Report of Europe Counterpart Application", dated Jul. 22, 2019, pp. 1-7.

(Continued)

*Primary Examiner* — Tuan H Nguyen
(74) *Attorney, Agent, or Firm* — JCIPRNET

(57) ABSTRACT

An image processing system, an image processing device and an image processing program facilitating setting of illumination condition are provided. A control device controls a light emission portion in a manner that each of plural types of partial regions set on a light emission surface emits light, and controls a camera to image an object in synchronization with light emission of each of the plural types of partial regions. The control device outputs reflection profile information, which is generated based on input images generated in each partial region emitting light, and the reflection profile information shows relationships between positions within the light emission surface and degrees of light reflected at attention sites of the object and incident to the camera with respect to light irradiated from the positions to the object.

14 Claims, 22 Drawing Sheets

(56) References Cited

OTHER PUBLICATIONS

"Office Action of China Counterpart Application", dated Jun. 28, 2020, with English translation thereof, pp. 1-19.

* cited by examiner

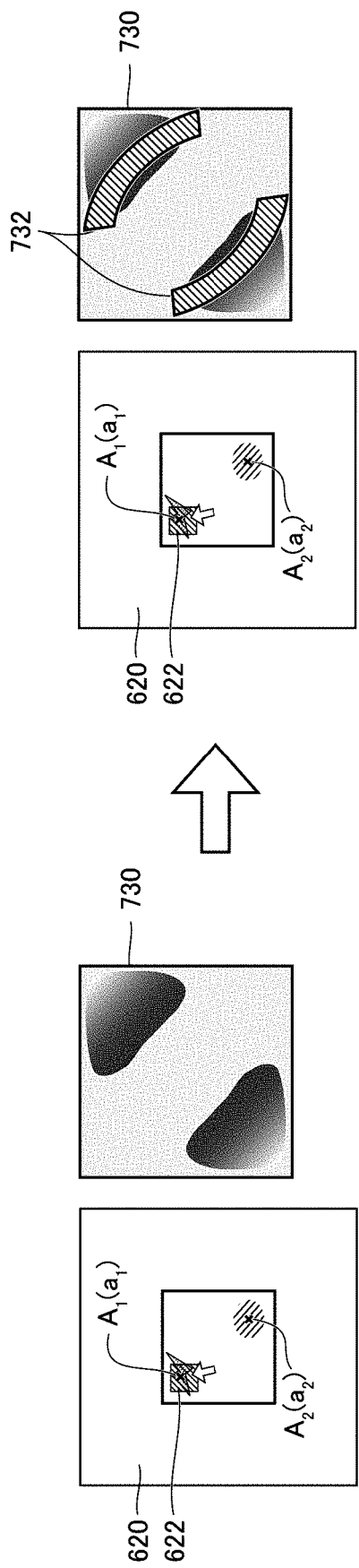
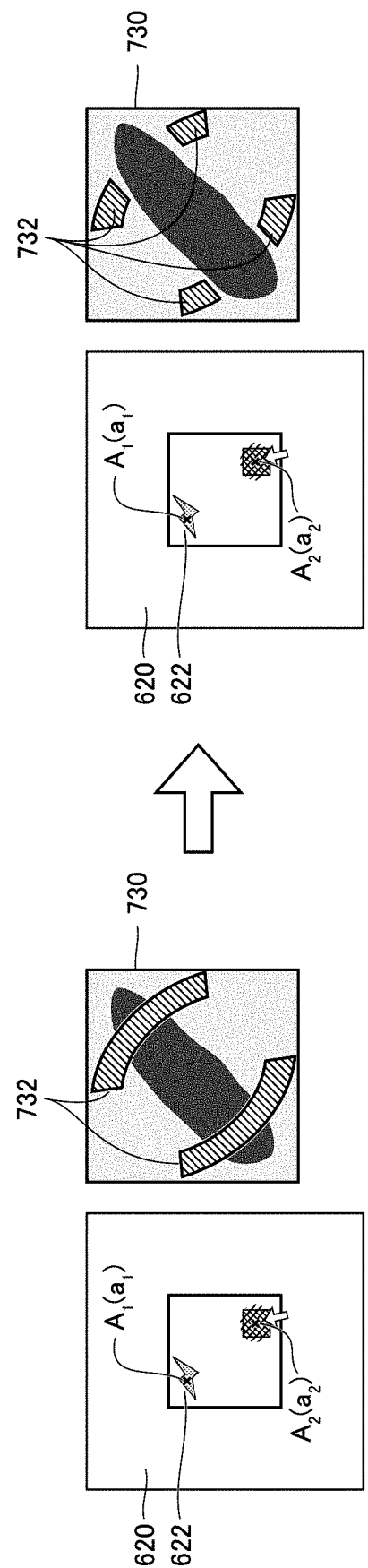
FIG. 21(a)
FIG. 21(b)
FIG. 21(c)
FIG. 21(d)

IMAGE PROCESSING SYSTEM, IMAGE PROCESSING DEVICE AND IMAGE PROCESSING PROGRAM

CROSS-REFERENCE TO RELATED APPLICATION

This application claims the priority of Japan patent application serial no. 2018-047628, filed on Mar. 15, 2018. The entirety of the above-mentioned patent application is hereby incorporated by reference herein and made a part of this specification.

BACKGROUND

Technical Field

The disclosure relates to an image processing system, an image processing device and an image processing program.

Related Art

In an FA (Factory Automation) field and the like, an image processing technique is used in which an object is imaged under illumination by light from an illumination device and information about a work-piece is obtained from image data that is generated.

As the illumination device used in an image processing technology field, various illumination devices are developed. For example, in Japanese laid-open No. 2015-232487 (patent document 1), an illumination device including a plurality of lamps with different illumination directions is disclosed.

Related Art Document(s)

Patent Document(S)

(Patent Document 1) Japanese Laid-Open No. 2015-232487

When the illumination device including a plurality of lamps with different illumination directions is used, there is a risk that when illumination conditions are determined, there are many patterns of selectable lamps and setting of the illumination conditions become complicated.

SUMMARY

According to one example of the disclosure, an image processing system which has an imaging portion imaging an object and a light emission portion having a light emission surface directed toward the object is provided. The image processing system includes: a light emission control portion, which controls the light emission portion in a manner that each of plural types of partial regions set in advance in the light emission surface emits light; an imaging control portion, which controls the imaging portion to image in synchronization with light emission of each of the plural types of partial regions; and an output portion, which outputs reflection profile information, wherein the reflection profile information is obtained based on a plurality of images which are captured by the imaging portion in synchronization with the light emission of each of the plural types of partial regions, and the reflection profile information shows relationships between positions within the light emission surface and degrees of light reflected at attention sites of the object and incident to the imaging portion with respect to the light irradiated to the object from the positions.

According to another example of the disclosure, an image processing device which controls an imaging portion imaging an object and a light emission portion having a light emission surface directed toward the object to perform an image processing is provided. The image processing device includes: a light emission control portion, which controls the light emission portion in a manner that each of plural types of partial regions set in advance in the light emission surface emits light; an imaging control portion, which controls the imaging portion to image in synchronization with light emission of each of the plural types of partial regions; and an output portion, which outputs reflection profile information, wherein the reflection profile information is obtained based on a plurality of images which are captured by the imaging portion in synchronization with the light emission of each of the plural types of partial regions, and the reflection profile information shows relationships between positions within the light emission surface and degrees of light reflected at attention sites of the object and incident to the imaging portion with respect to the light irradiated to the object from the positions.

According to another example of the disclosure, an image processing program which is executed in an image processing device is provided, and the image processing device controls an imaging portion imaging an object and a light emission portion having a light emission surface directed toward the object to perform an image processing. The image processing program includes: controlling the light emission portion in a manner that each of plural types of partial regions set in advance in the light emission surface emits light; controlling the imaging portion to image in synchronization with light emission of each of the plural types of partial regions; and outputting reflection profile information, wherein the reflection profile information is obtained based on a plurality of images which are captured by the imaging portion in synchronization with the light emission of each of the plural types of partial regions, and the reflection profile information shows relationships between positions within the light emission surface and degrees of light reflected at attention sites of the object and incident to the imaging portion with respect to the light irradiated to the object from the positions.

BRIEF DESCRIPTION OF THE DRAWINGS

FIG. 21(a) to FIG. 21(d) are diagrams showing one example of a flow of setting the reference irradiation pattern.

DESCRIPTION OF THE EMBODIMENTS

Figure 1:
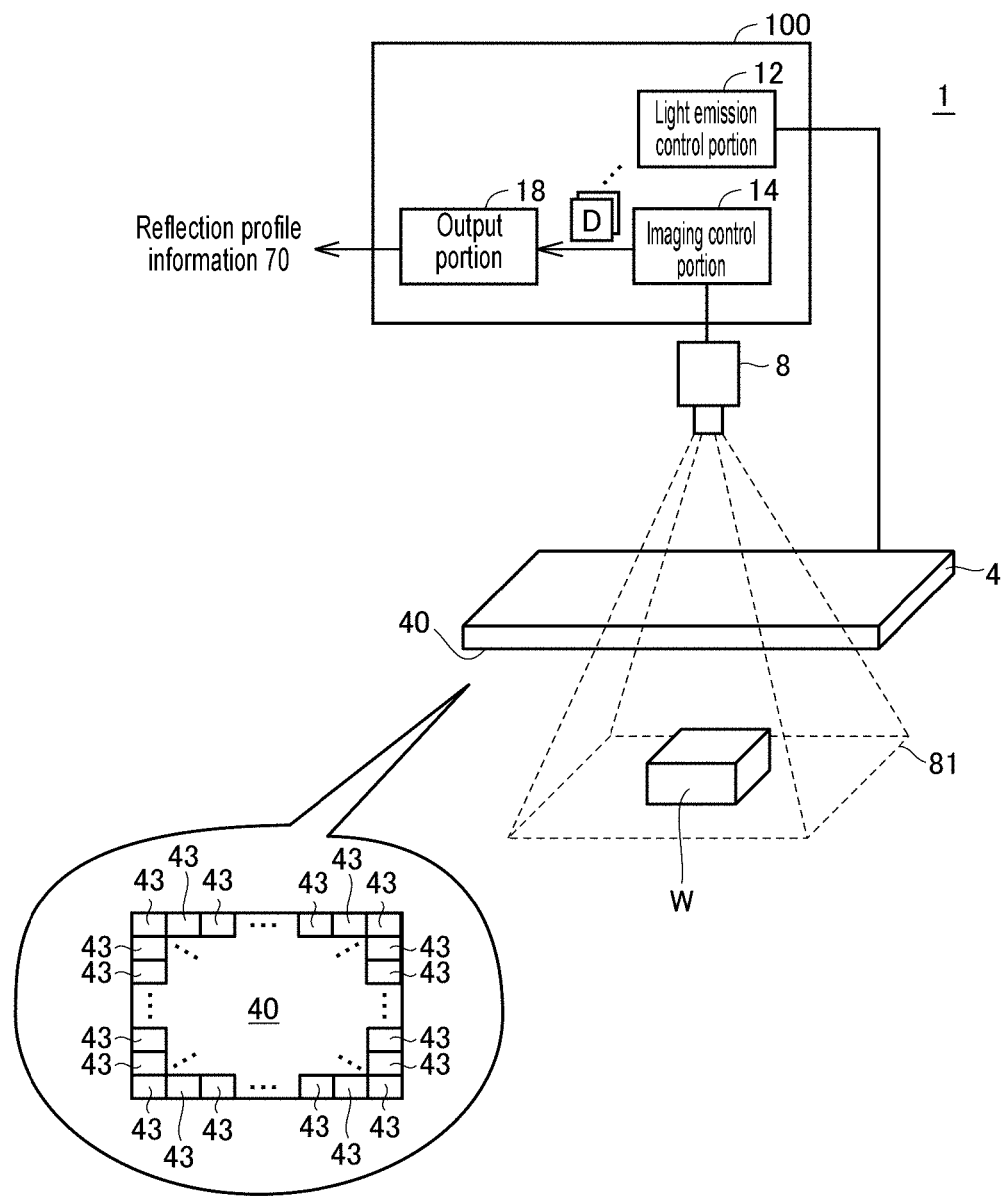
FIG. 1 is a diagram schematically showing an application scene of an image processing system of an embodiment.

The disclosure provides an image processing system, an image processing device and an image processing program, which facilitates the setting of the illumination conditions as described above.

According to one example of the disclosure, an image processing system which has an imaging portion imaging an object and a light emission portion having a light emission surface directed toward the object is provided. The image processing system includes: a light emission control portion, which controls the light emission portion in a manner that each of plural types of partial regions set in advance in the light emission surface emits light; an imaging control portion, which controls the imaging portion to image in synchronization with light emission of each of the plural types of partial regions; and an output portion, which outputs reflection profile information, wherein the reflection profile information is obtained based on a plurality of images which are captured by the imaging portion in synchronization with the light emission of each of the plural types of partial regions, and the reflection profile information shows relationships between positions within the light emission surface and degrees of light reflected at attention sites of the object and incident to the imaging portion with respect to the light irradiated to the object from the positions.

According to the disclosure, the reflection profile information which is a reference in determining illumination conditions is output, so that the setting of the illumination conditions becomes easy.

In the above-described disclosure, the reflection profile information may be information which is obtained from each of the plurality of images and which is based on luminance information corresponding to attention points of an imaging visual field in the images and relative positions of the partial regions in which the light is emitted when the images are captured with respect to the attention points.

According to the disclosure, the reflection profile information obtained for every attention point can be compared with one another in the same dimension regardless of the position relationships between the light emission surface and these attention points.

In the above-described disclosure, the output portion may output the reflection profile information by a representation form in which the information corresponding to the luminance information is output to a coordinate system with two or more axes corresponding to the relative positions.

According to the disclosure, regardless of position relationship between the light emission surface 40 and the attention points, they are expressed in the same coordinate system, so that comparison can be made easily when comparing the reflection profile information for every attention point.

In the above-described disclosure, the output portion may output the reflection profile information by the representation form in which the information corresponding to the luminance information is input to the coordinate system with two or more axes corresponding to the relative positions, wherein the reflection profile information corresponds to the attention points that are determined based on the position information on the images which are designated by a user with respect to the images of the imaging visual field imaged by the imaging portion.

According to the disclosure, the user can easily designate these attention points.

In the above-described disclosure, the output portion may simultaneously or sequentially output the reflection profile information obtained for a plurality of attention points within the imaging visual field to the coordinate system.

According to the disclosure, the reflection profile information of every attention point is simultaneously or sequentially output to the same coordinate system, so that it is easy to compare the reflection profile information of every attention point.

In the above-described disclosure, the image processing system may further include a determination portion which determines light emission conditions of the light emission portion using the reflection profile information.

According to the disclosure, the light emission conditions of the light emission portion are determined based on the reflection profile information, so that a description property to the light emission conditions that are determined can be ensured.

In the above-described disclosure, the light emission portion may be disposed between the imaging portion and the object, and have at least any one of a shape not blocking a visual field at the time of imaging and an optical characteristic not blocking the visual field.

According to the disclosure, by disposing the light emission portion between the imaging portion and the object, compared with an occasion that the light emission portion is not disposed between the imaging portion and the object, an overall compact image processing system can be provided.

As a result, selection of applicable equipment can be avoided from being restricted as much as possible.

According to another example of the disclosure, an image processing device which controls an imaging portion imaging an object and a light emission portion having a light emission surface directed toward the object to perform an image processing is provided. The image processing device includes: a light emission control portion, which controls the light emission portion in a manner that each of plural types of partial regions set in advance in the light emission surface emits light; an imaging control portion, which controls the imaging portion to image in synchronization with light emission of each of the plural types of partial regions; and an output portion, which outputs reflection profile information, wherein the reflection profile information is obtained based on a plurality of images which are captured by the imaging portion in synchronization with the light emission of each of the plural types of partial regions, and the reflection profile information shows relationships between positions within the light emission surface and degrees of light reflected at attention sites of the object and incident to the imaging portion with respect to the light irradiated to the object from the positions.

According to the disclosure, the reflection profile information which is a reference in determining the illumination conditions is output, so that the setting of the illumination conditions becomes easy.

According to another example of the disclosure, an image processing program which is executed in an image processing device is provided, and the image processing device controls an imaging portion imaging an object and a light emission portion having a light emission surface directed toward the object to perform an image processing. The image processing program includes: controlling the light emission portion in a manner that each of plural types of partial regions set in advance in the light emission surface emits light; controlling the imaging portion to image in synchronization with light emission of each of the plural types of partial regions; and outputting reflection profile information, wherein the reflection profile information is obtained based on a plurality of images which are captured by the imaging portion in synchronization with the light emission of each of the plural types of partial regions, and the reflection profile information shows relationships between positions within the light emission surface and degrees of light reflected at attention sites of the object and incident to the imaging portion with respect to the light irradiated to the object from the positions.

According to the disclosure, the reflection profile information which is a reference in determining the illumination conditions is output, so that the setting of the illumination conditions becomes easy.

The reflection profile information which is a reference in determining the illumination conditions is output, so that the setting of the illumination conditions becomes easy.

§ 1 Application Example

Figure 2:
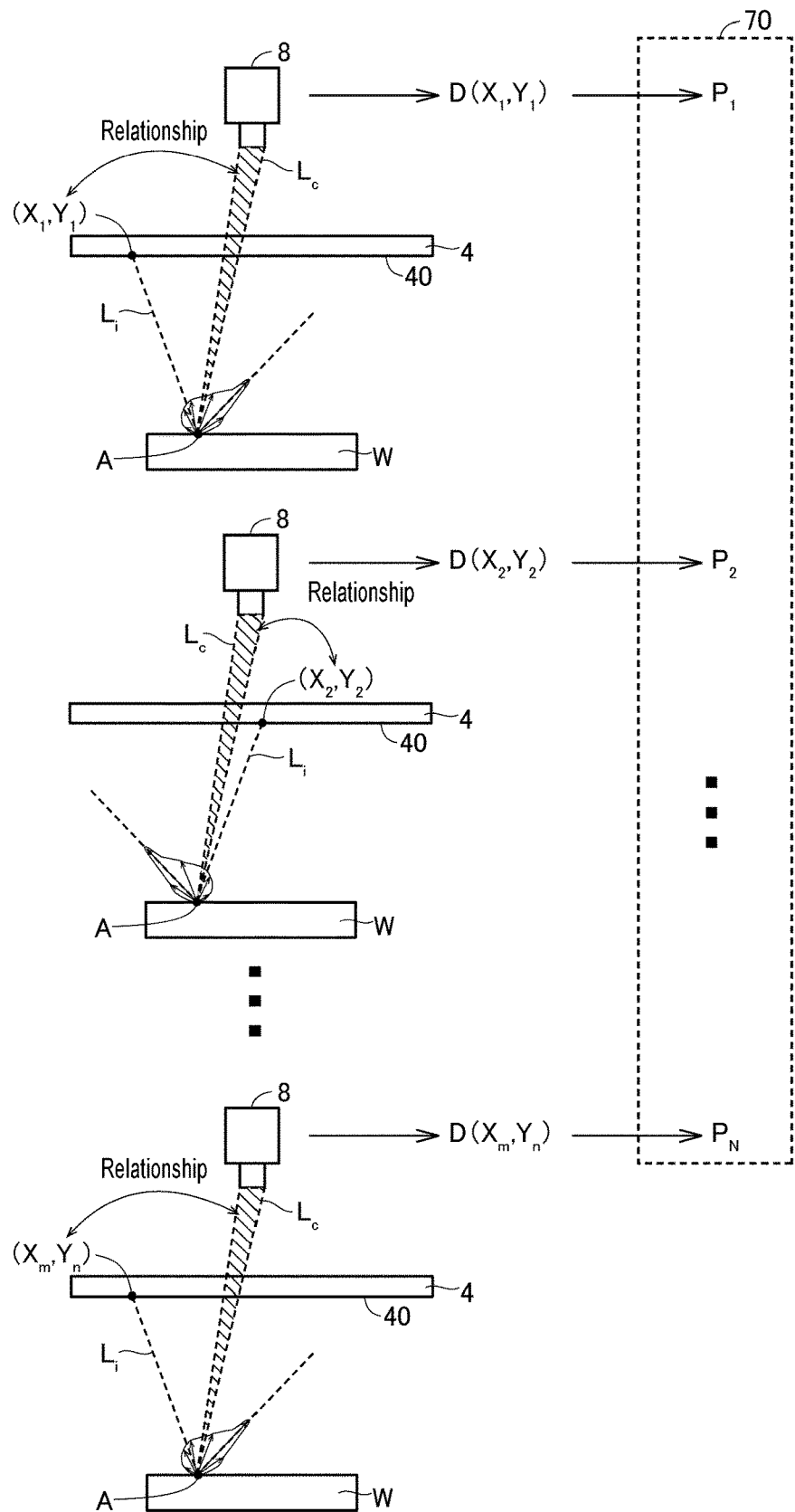
FIG. 2 is a diagram schematically showing reflection profile information.

At first, one example of a scene in which the disclosure is applied is First, with reference to FIG. 1 and FIG. 2, an example of a scene to which the present invention is applied will be described. FIG. 1 is a diagram schematically showing an application scene of an image processing system 1 of an embodiment. FIG. 2 is a diagram schematically showing reflection profile information 70.

The image processing system 1 of the embodiment includes a camera 8 which is one example of an imaging portion, an illumination device 4 which is one example of a light emission portion, and a control device 100 which controls processing executed in the image processing system 1. In addition, the control device 100 includes a light emission control portion 12 which controls the illumination device 4, an imaging control portion 14 which controls the camera 8, and an output portion 18 which outputs the reflection profile information. As an example, the light emission control portion 12, the imaging control portion 14 and the output portion 18 are arranged in the control device 100 which has a structure in accordance with general-purpose computer architecture.

The illumination device 4 has a light emission surface 40 directed toward an object W. The illumination device 4 can make any region of the light emission surface 40 emit light, and is made of an organic EL (Electro Luminescence) for example.

The light emission control portion 12 controls the illumination device 4 so that each of plural types of partial regions 43 which are set on the light emission surface 40 emits light. Each of the plural types of partial regions 43 at least has different positions within the light emission surface 40. Sizes of each of the plural types of partial regions 43 may be the same as each other or be different from each other. In addition, shapes of each of the plural types of partial regions 43 may be the same as each other or be different from each other. In addition, one portion of one partial region 43 may be a region in common with one portion of an adjacent partial region 43.

The imaging control portion 14 controls the camera 8 in a manner that the object W is imaged in synchronization with light emission of each of the plural types of partial regions 43. Here, "the object W is imaged in synchronization" means that the object W is imaged every time the kind of the partial regions 43 emitting light is changed.

The light emission control portion 12 and the imaging control portion 14 control the illumination device 4 and the camera 8 as described above, and thereby an input image D is generated for every partial region emitting light and a plurality of input images D are obtained.

The output portion 18 outputs the reflection profile information 70 obtained based on the plurality of input images D. The reflection profile information 70 is the information showing relationships between a position within the light emission surface 40 and degrees of light reflected at attention sites A of the object W and incident to the camera 8 with respect to light irradiated to the object W from the aforementioned positions.

Specifically, the reflection profile information 70 is described with reference to FIG. 2. In the example shown in FIG. 2, one kind of partial region 43 is set in a position ($X_1$, $Y_1$) on the light emission surface 40. An input image D ($X_1$, $Y_1$), which is obtained when the partial region 43 set in the position ($X_1$, $Y_1$) emits a light, is generated by a light $L_c$ which is resulted from a light $L_i$ that is irradiated from the position ($X_1$, $Y_1$) being reflected by the object W and incident to the camera 8. Accordingly, a feature amount $P_1$ is obtained from the input image D ($X_1$, $Y_1$), and the feature amount $P_1$ is a degree of the light $L_c$ that is reflected at the attention site A of the object W and incident to the camera 8 with respect to the light $L_i$ that is irradiated from the position ($X_1$, $Y_1$) on the light emission surface 40. Similarly, a feature amount $P_2$ is obtained from an input image D ($X_2$, $Y_2$) which is obtained when a partial region 43 set in a position ($X_2$, $Y_2$) emits a light, and the feature amount $P_2$ is a degree of a light $L_c$ that is reflected at the attention site A of the object W and incident to the camera 8 with respect to the light $L_i$ that is irradiated from the position $(X_2, Y_2)$.

Relationships between positions $(X, Y)$ on the light emission surface 40 and feature amounts P are obtained from each of the plurality of input images D. That is, the reflection profile information 70 is an aggregation of information consisting of the positions $(X, Y)$ on the light emission surface and the feature amounts P. In the example shown in FIG. 2, the feature amount $P_1$ to the feature amount $P_N$ are obtained for each of the position $(X_1, Y_1)$ to the position $(X_m, Y_n)$ on the light emission surface 40, and the aggregation of the feature amount $P_1$ to the feature amount $P_N$ is called as the reflection profile information 70.

When the reflection profile information 70 is obtained, a reference of how much light is incident to the camera 8 can be known when the light is irradiated from any position on the light emission surface 40 to the object W. Therefore, the reflection profile information 70 is a reference for determining irradiation conditions. As a result, setting of illumination conditions becomes easy. Furthermore, because the setting of the illumination conditions can be performed based on the reflection profile information 70, a description property to the set illumination conditions can be ensured.

§ 2 Specific Example

Figure 3:
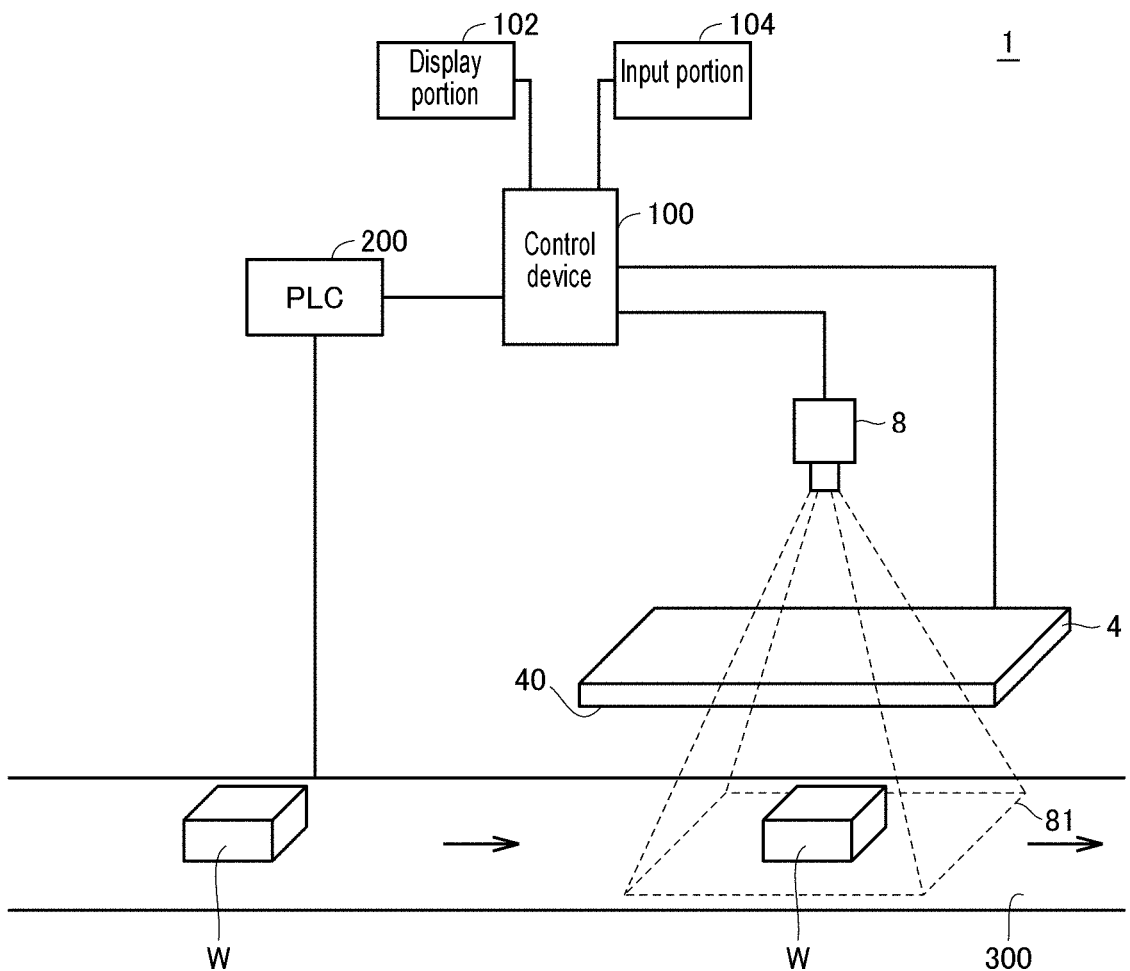
FIG. 3 is a schematic diagram showing one example of a production line in which the image processing system of the embodiment is applied.

A. One Example of Production Line in which Image Processing System is Applied Next, one example of the image processing system of the embodiment is described. FIG. 3 is a schematic diagram showing one example of a production line in which the image processing system 1 of the embodiment is applied.

As shown in FIG. 3, the image processing system 1 of the embodiment includes the camera 8 which images the object W continuously carried in, the illumination device 4 which illuminates the object W, and the control device 100 which controls the illumination device 4 and the camera 8.

The camera 8 includes an optical system such as a lens, an aperture or the like and a photoelectric converter such as a CCD (Charge Coupled Device) image sensor, a CMOS (Complementary Metal Oxide Semiconductor) image sensor or the like as main configuration elements. The photoelectric converter is a device which converts light included in an imaging visual field 81 of the camera 8 into image signals.

The illumination device 4 irradiates light to the object W disposed on a stage 300. Irradiation patterns of the light which are irradiated from the light emission surface 40 can be arbitrarily changed according to the irradiation patterns instructed from the control device 100.

The illumination device 4 has translucency and is typically a translucent organic EL lamp. When a side where the camera 8 is disposed is set as an upper side and a side where the object W is disposed is set as a lower side with a position where the illumination device 4 is disposed as a basis, the illumination device 4 may have translucency to a degree that the camera 8 can image, via the illumination device 4, an object which is positioned lower than the illumination device 4.

The object W, which is an inspection subject, is moved by the movable stage 300 to an inspection position where the camera 8 and the illumination device 4 are fixed. The stage 300 is controlled by a PLC 200 (Programmable Logic Controller). The PLC 200 controls the stage 300 in a manner that when the object W is conveyed to the inspection position, the stage 300 stops instantly until an appearance inspection by the image processing system 1 is completed.

At this moment, the control device 100 irradiates the light to the object W by the illumination device 4 and images the object W by the camera 8. The control device 100 controls the illumination device 4 to change the irradiation pattern of the light irradiated from the illumination device 4, and controls the camera 8 to image the object W by the camera 8 every time the irradiation pattern of the light is changed. The control device 100 inspects an appearance of the object W by using plural pieces of captured images that are obtained as above. In addition, the control device 100 outputs an inspection result to the PLC 200 when the appearance inspection is completed. The PLC 200 makes the next object W be conveyed to the inspection position based on the output of the inspection result from the control device 100.

The control device 100 is electrically connected to a display portion 102 and an input portion 104. The display portion 102 typically consists of a liquid crystal display and displays setting contents to the user for example. The input portion 104 typically consists of a mouse and functions for inputting information relating to various settings. For example, the user can input setting information relating to settings of inspection conditions by operating the input portion 104 based on the information displayed in the display portion 102. Besides, the input portion 104 is configured by the mouse, and can also be configured by a touch panel, a keyboard or a combination thereof.

B. One Example of Hardware Configuration of Control Device

Figure 4:
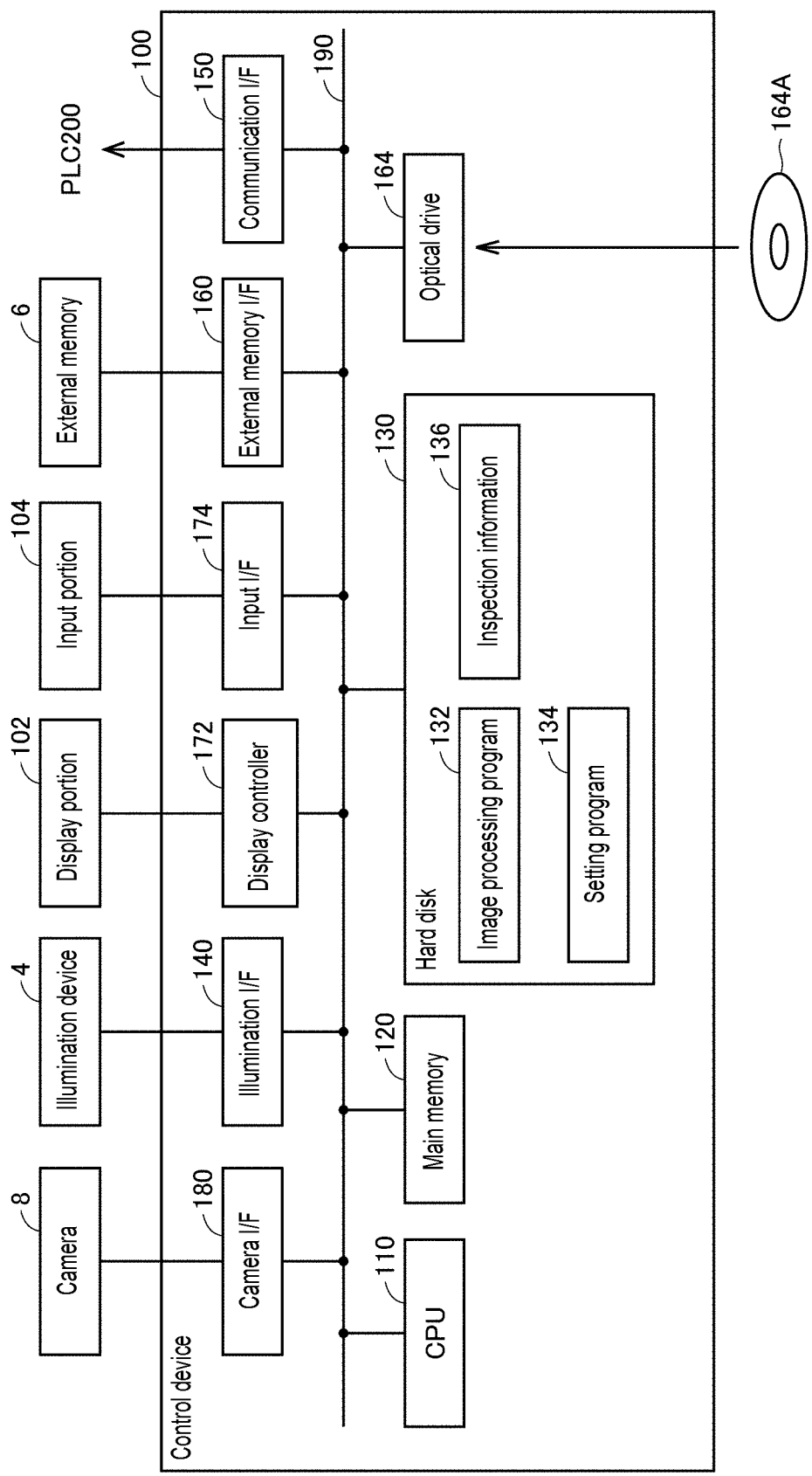
FIG. 4 is a schematic diagram showing a hardware configuration of a control device.

FIG. 4 is a schematic diagram showing a hardware configuration of the control device 100. The control device 100 includes a CPU (Central Processing Unit) 110, a main memory 120, a hard disk 130, a camera interface (I/F) 180, an illumination I/F 140, a display controller 172, an input I/F 174, a communication I/F 150, an external memory I/F 160 and an optical drive 164. Each of these portions is connected to one another via a bus 190 so that they are capable of data communication.

The CPU 110 develops a program (a code), which includes an image processing program 132 and a setting program 134 installed on the hard disk 130, in the main memory 120 and executes these programs in a predefined order, thereby performing various calculations. The main memory 120 is typically a volatile storage device such as a DRAM (Dynamic Random Access Memory) or the like.

The hard disk 130 is an internal memory included in the control device 100 and is a non-volatile storage device. The hard disk 130 includes inspection information 136 relating to the inspection conditions in addition to the image processing program 132 and the setting program 134. Besides, in addition to the hard disk 130 or in place of the hard disk 130, a semiconductor storage device such as a flash memory or the like can also be adopted.

The camera I/F 180 mediates data transmission between the CPU 110 and the camera 8. That is, the camera I/F 180 is connected to the camera 8 which generates the images. In addition, the camera I/F 180 gives commands of controlling imaging actions in the connected camera 8 according to internal commands from the CPU 110.

The illumination I/F 140 mediates the data transmission between the CPU 110 and the illumination device 4. That is, the illumination I/F 140 is connected to the illumination device 4. In addition, the illumination I/F 140 transmits, according to internal commands from the CPU 110, commands about the irradiation patterns to the connected illumination device 4. The illumination device 4 irradiates the light with the irradiation patterns based on the received commands. Besides, the illumination device 4 may be connected to the control device 100 via the camera 8. In addition, the camera 8 may be connected to the control device 100 via the illumination device 4.

The display controller 172 is connected to the display portion 102 and notifies the user of a processing result or the like in the CPU 110. That is, the display controller 172 is connected to the display portion 102 and controls display in the display portion 102.

The input I/F 174 is connected to the input portion 104 and mediates the data transmission between the CPU 110 and the input portion 104. That is, the input I/F 174 receives operation commands given by the user operating the input portion 104. The operation commands include, for example, operation commands for setting the inspection conditions.

The communication I/F 150 exchanges various data between the PLC 200 and the CPU 110. Besides, the communication I/F 150 can also exchange data between a server and the CPU 110. The communication I/F 150 includes hardware corresponding to a network for exchanging various data with the PLC 200.

The external memory I/F 160 is connected to an external memory 6 and performs processing of reading/writing of data into the external memory 6. The external memory 6 is detachable to the control device 100 and is typically a non-volatile storage device such as a USB (Universal Serial Bus) memory, a memory card or the like. In addition, various programs such as the image processing program 132 or the like are not required to be saved in the hard disk 130, and can also be saved in a server which is communicable with the control device 100, the external memory 6 which can be directly connected to the control device 100, or an optical disk 164A. For example, the various programs which are executed in the control device 100 and various parameters used in the various programs are circulated in a state of being stored in the external memory 6, and the external memory I/F 160 reads out the various program and the various parameters from the external memory 6. Elsewise, the programs or the parameters which are downloaded from the server or the like which is communicably connected to the control device 100 may be installed on the control device 100. In addition, the control device 100 can also install the programs or the parameters on the control device 100 from the optical disk 164A through the optical drive 164.

The optical drive 164 reads out from the optical disk 164A or the like the various programs stored therein and installs the various programs on the hard disk 130.

Besides, the image processing program 132 and the setting program 134 of the embodiment can also be provided by being incorporated into one portion of other programs. In addition, alternatively, part of or all of the functions provided by the execution of the image processing program 132 can also be implemented as a dedicated hardware circuit.

C. Structure of Illumination Device 4

Figure 5:
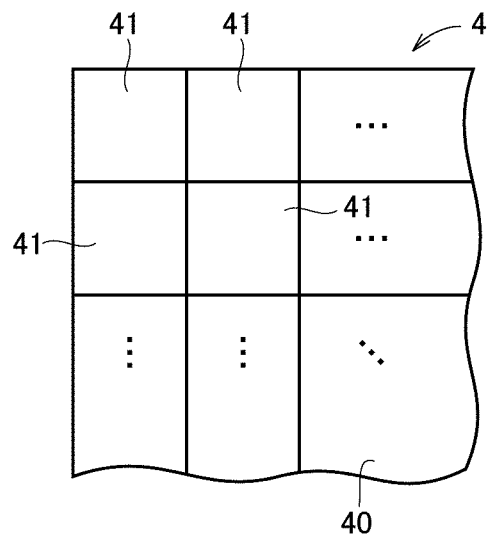
FIG. 5 is a schematic diagram in which one portion of an illumination device of the embodiment is enlarged.

FIG. 5 is a schematic diagram in which one portion of the illumination device 4 of the embodiment is enlarged. The illumination device 4 includes a plurality of illumination elements 41 which are disposed in a matrix shape. The illumination device 4 can light up each illumination element 41 independently. The irradiation patterns in the embodiment are determined by the illumination elements 41 to be lighted up among the plurality of illumination elements 41. In addition, in the embodiment, it is described that white light is irradiated from each illumination element 41, and the irradiation patterns refer to shading patterns on the light emission surface 40. In addition, in the embodiment, the illumination device 4 can light up or light off each illumination element 41 independently. Besides, the illumination device 4 can also adjust light emission intensity of each illumination element 41.

Each illumination element 41 includes, for example, a light emission region and a translucent region, and by making the light emission region emit light, it can be approximated as that the entire illumination element 41 emits light in terms of an illumination effect to the object W. In addition, the translucency can be kept by having the translucent region.

D. First Specific Example

In the following, reflection profile information 72 in the first specific example is described.

<Obtainment Method of Reflection Profile Information 72>

Figure 6:
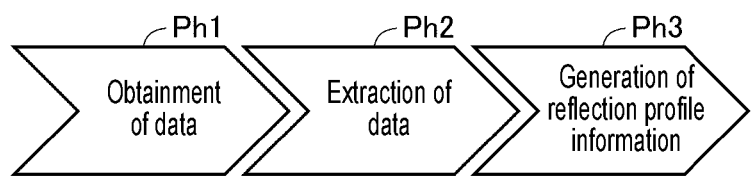
FIG. 6 is a diagram showing one example of a process for obtaining reflection profile information in a first specific example.

The reflection profile information 72 is the information showing relationships between positions within the light emission surface 40 and degrees of the light reflected at the attention sites A of the object W and incident to the camera 8 with respect to the light irradiated to the object W from the aforementioned positions. FIG. 6 is a diagram showing one example of a process for obtaining the reflection profile information 72 in the first specific example. The process for obtaining the reflection profile information 72 includes a process Ph1 for obtaining the data, a process Ph2 for extracting the data, and a process Ph3 for generating the reflection profile information 72 from the extracted data.

(Process Ph1 for Obtaining Data)

Figure 7:
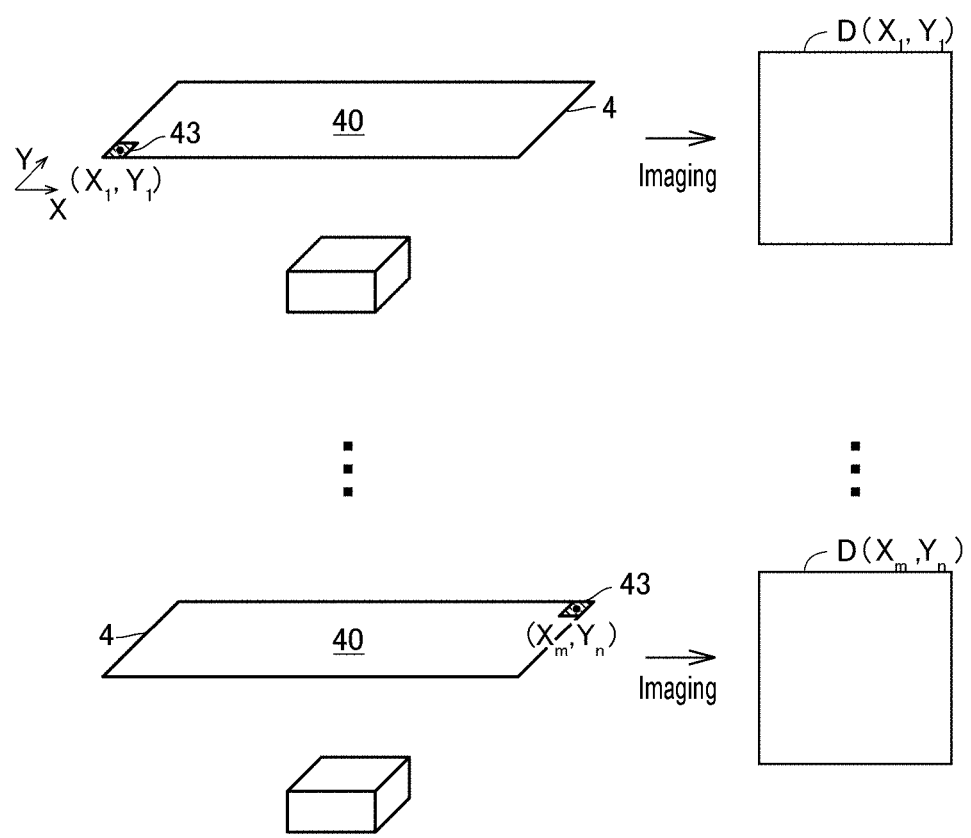
FIG. 7 is a diagram for describing an obtainment method of data.

FIG. 7 is a diagram for describing an obtainment method of data. Besides, in FIG. 7, an illustration of the camera 8 is omitted. The illumination device 4 can make only the partial regions 43 set within the light emission surface 40 emit light. The light emission surface 40 consists of an aggregation of all the illumination elements 41. On the other hand, the partial regions 43 consist of one or a plurality of illumination elements 41. That is, the partial regions 43 are a partial aggregation with respect to the aggregation of all the illumination elements 41. The illumination device 4 can light up each of the plurality of illumination elements 41 independently, and thus the illumination device 4 can make only the set partial regions 43 emit light by lighting up all the illumination elements 41 included within the partial regions 43 set on the light emission surface 40. Besides, the illumination device 4 may make all the illumination elements 41 included in the partial regions 43 lighted up with the same light emission intensity or with light emission intensities different from one another.

The control device 100 controls the illumination device 4 to light up each of plural types of partial regions 43 set on the light emission surface 40. Each of the plural types of partial regions 43 is different at least in positions within the light emission surface 40. Here, the positions of the partial regions 43 within the light emission surface 40 mean centres of the partial regions 43. A size of each of the plural types of partial regions 43 may be the same as each other or be different from each other. In addition, a shape of each of the plural types of partial regions 43 may be the same as each other or be different from each other. In addition, one portion of one partial region 43 may be a region in common with one portion of an adjacent partial region 43. In the embodiment, the shape and the size of each of the plural types of partial regions 43 are the same as one another, and each partial region 43 does not overlap with another partial region 43. Sizes of the partial regions 43 may be the sizes that can ensure a light amount to a degree at which the camera 8 can capture images from which at least one portion of the object W can be recognized when the partial regions 43 are made to emit light. Here, because the irradiation patterns refer to the shading patterns of the light emission surface 40, making one partial region 43 emit light can be referred to as making the light emission surface 40 emit light with one irradiation pattern. In addition, each of the plural types of partial regions 43 can be referred to as an irradiation pattern different from one another.

In an example shown in FIG. 7, the control device 100 sets the partial regions 43 in each of the position $(X_1, Y_1)$ to the position $(X_m, Y_n)$ on the light emission surface 40 and makes a total of m×n partial regions 43 emit light independently. The control device 100 controls the camera 8 to image in synchronization with the light emission of each of the plural types of partial regions 43, and obtains a total of m×n input images D. Here, in the embodiment, for the sake of convenience, an X direction on the light emission surface 40 is described as a movement direction of the object W in FIG. 3, and a Y direction is described as a direction orthogonal to the X direction and an irradiation direction. The input images D (X, Y) mean the images captured and obtained in a state when the partial regions 43 set in the positions (X, Y) are made to emit light. Here, in FIG. 7, a position of each of the camera 8, the illumination device 4 and the object W is fixed. That is, the imaging conditions at the time when the input image D $(X_1, Y_1)$ to the input image D $(X_m, Y_n)$ are captured are different at least in the positions on the light emission surface 40 which emits light.

(Process Ph2 for Extracting Data)

Figure 8:
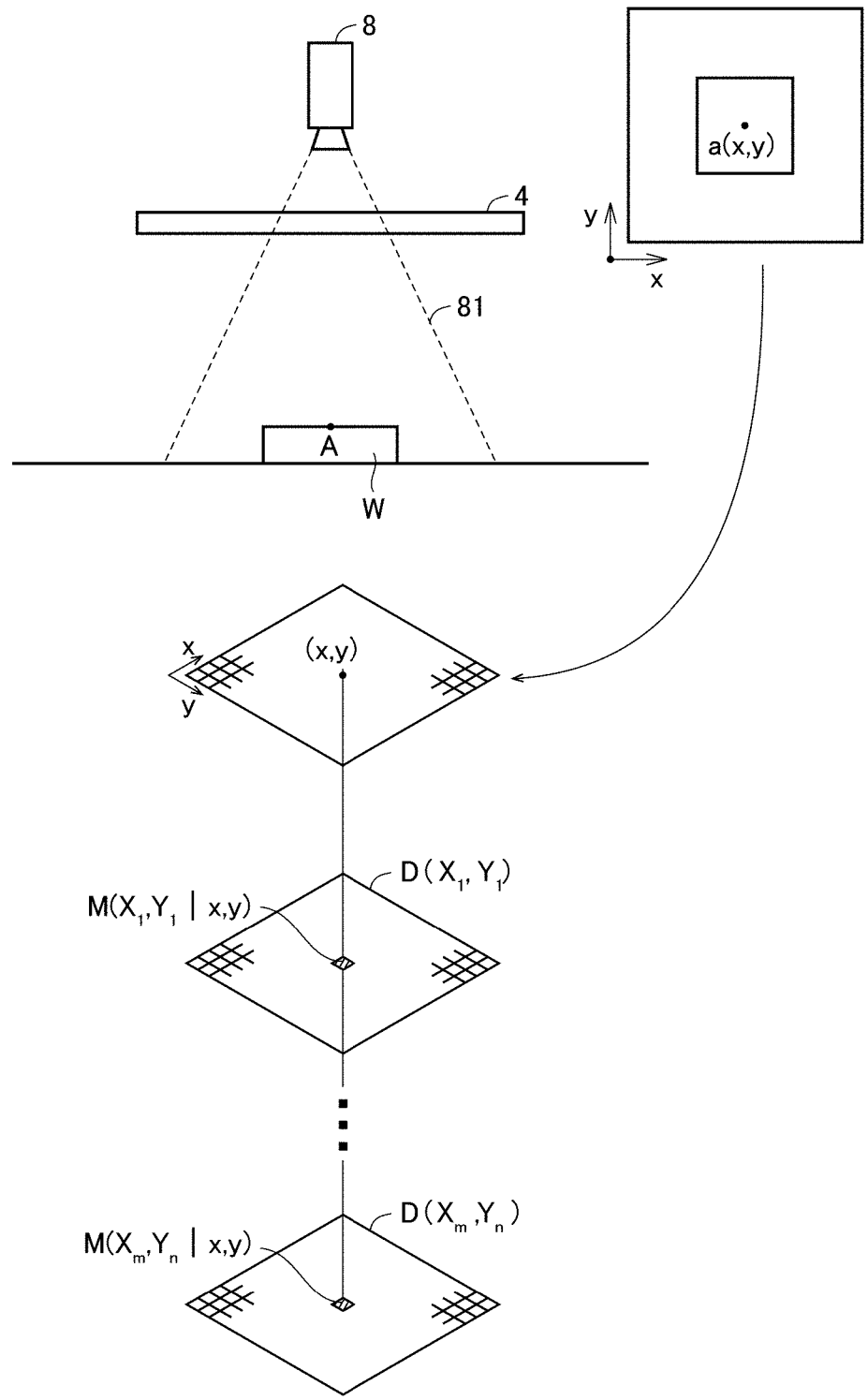
FIG. 8 is a diagram for describing an extraction method of the data.

FIG. 8 is a diagram for describing an extraction method of the data. The control device 100 extracts partial images M corresponding to the attention sites A of the object W from each of the input image D $(X_1, Y_1)$ to the input image D $(X_m, Y_n)$. Here, the partial images M corresponding to the attention sites A of the object W are the partial regions which are extracted to include attention positions a (x, y) corresponding to the attention sites A of the object W within the input images D. All the input image D $(X_1, Y_1)$ to the input image D $(X_m, Y_n)$ are obtained by being captured in the same imaging visual field 81. Therefore, camera coordinate positions (x, y) of the partial images M corresponding to the attention sites A are in common in each of the input image D $(X_1, Y_1)$ to the input image D $(X_m, Y_n)$.

The partial images M may be data configured by one pixel or be data configured by a plurality of pixels, and may include at least pixels of the attention positions a (x, y) corresponding to the attention sites A. Besides, the attention sites A may show certain prescribed positions or show predefined ranges.

The control device 100 extracts the partial images M of the attention positions a (x, y) within a camera coordinate corresponding to the attention sites A from each of the input images D $(X_1, Y_1)$ to D $(X_m, Y_n)$, and obtains the partial image M $(X_1, Y_1|x, y)$ to the partial images M $(X_m, Y_n|x, y)$. Here, the left of a vertical bar in brackets of the partial images M $(X, Y|x_r, y_r)$ means the positions (X, Y) of the light emission surface 40 which emits light when the input images D which are extraction origins are captured. The right of the vertical bar in the brackets of the partial images M $(X, Y|x_r, y_r)$ means the attention positions a (x, y) within the input images D which are targets at the time of extracting the partial images M. That is, the partial images M $(X, Y|x_r,$ $y_r)$ mean the partial regions of the input images D (X, Y) which are extracted to include attention positions $a_r$ $(x_r, y_r)$ within the input images D (X, Y).

(Process Ph3 for Generating Reflection Profile Information 72 from Extracted Data)

Figure 9:
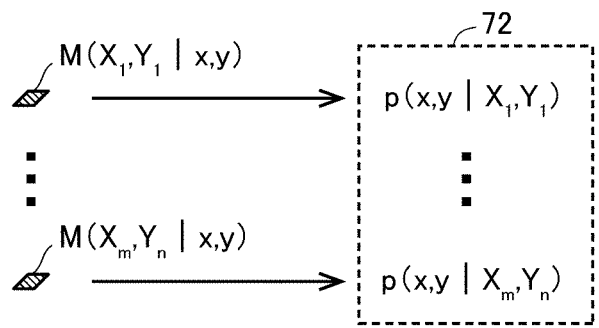
FIG. 9 is a diagram for describing a generation method of the reflection profile information.

FIG. 9 is a diagram for describing a generation method of the reflection profile information 72. The control device 100 extracts feature amounts p from each of the partial image M $(X_1, Y_1|x, y)$ to the partial image M $(X_m, Y_n|x, y)$. The feature amounts p are values showing intensities of the light which are reflected at the attention sites A and incident to the camera 8 among the light which are incident to the attention sites A from the partial regions 43 set on the light emission surface 40, and include, for example, luminance values, or values obtained by standardizing the luminance values. In addition, the feature amounts p can also be information obtained after performing a pre-processing such as a spatial filtering or the like on the partial images M. Here, the feature amounts p (x, y|X, Y) mean feature amounts extracted from the partial images M (X, Y|x, y).

In the embodiment, an aggregation of the feature amount p $(x, y|X_1, Y_1)$ to the feature amount p $(x, y|X_m, Y_n)$ is the reflection profile information 72. That is, the control device 100 generates the reflection profile information 72 by extracting the feature amount p $(x, y|X_1, Y_1)$ to the feature amount p $(x, y|X_m, Y_n)$ from the partial image M $(X_1, Y_1|x, y)$ to the partial image M $(X_m, Y_n|x, y)$.

Here, the left of the vertical bar in the brackets of the feature amounts p (x, y|X, Y) means the attention positions a (x, y) which are positions of the attention sites A within the imaging visual field 81. The right of the vertical bar in the brackets of the feature amounts p (x, y|X, Y) means which positions (X, Y) on the light emission surface 40 are made to emit light to obtain the feature amounts p. That is, feature amounts p (x, y|X, Y) can also be referred to as the values based on the light incident from the positions (X, Y) on the light emission surface 40, which are among the light incident to the attention sites A (the attention positions a (x, y)).

In addition, the input images D (X, Y) are generated by the light incident to the camera 8 among the light which are irradiated from the partial regions 43 set in the positions (X, Y) on the light emission surface 40 and reflected at the attention sites A. In addition, the feature amounts p (x, y|X, Y) are values showing intensities of the light that reflected at the attention sites A and incident to the camera 8 among the light incident to the object W from the positions (X, Y) on the light emission surface 40. That is, the feature amounts p (x, y|X, Y) can be referred to as the information showing degrees of the light reflected at the attention sites A and incident to the camera 8 with respect to the light irradiated from the positions (X, Y). Therefore, the reflection profile information 72, which is configured by the aggregation of the feature amount p $(x, y|X_1, Y_1)$ to the feature amount p $(x, y|X_m, Y_n)$, is referred to as the information which shows the relationships between the positions (X, Y) within the light emission surface 40 which are the irradiation positions, and the degrees of the light reflected at the attention sites A and incident to the camera 8 with respect to the light irradiated from the irradiation positions.

<Output Method of Reflection Profile Information 72>

Figure 10:
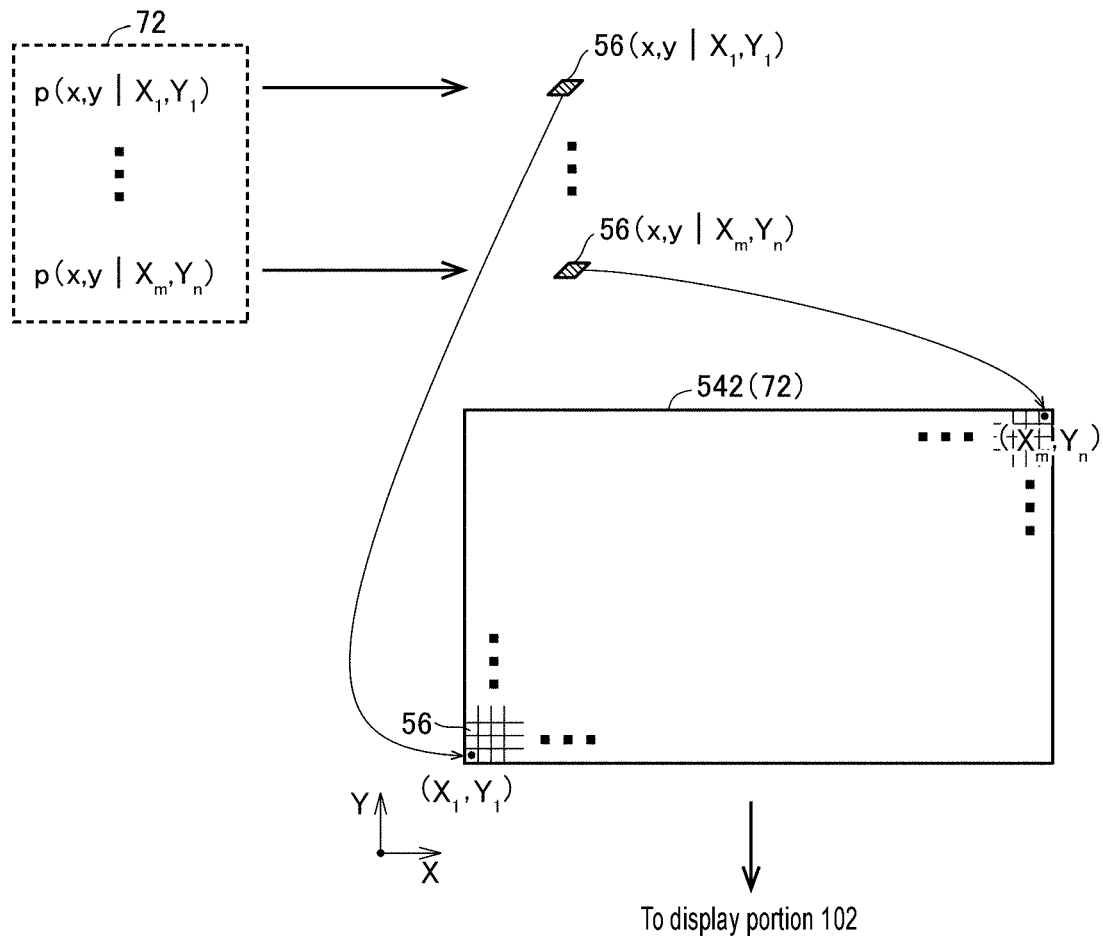
FIG. 10 is a diagram showing one example of an output method of the reflection profile information.

FIG. 10 is a diagram showing one example of an output method of the reflection profile information 72. In the example shown in FIG. 10, the control device 100 outputs a mapping image 542, in which the feature amounts p are mapped in an XY coordinate which is the coordinate system on the light emission surface 40, as the reflection profile information 72. The mapping image 542 is an image in which gray values 56 shown by the shading degrees corresponding to a magnitude of the feature amounts p are mapped in the XY coordinate. For example, the gray value 56 (x, y|$X_1$, $Y_1$) corresponding to the magnitude of the feature amount p (x, y|$X_1$, $Y_1$) is mapped in a position ($X_1$, $Y_1$) of the XY coordinate. The control device 100 converts each of the feature amount p (x, y|$X_1$, $Y_1$) to the feature amount p (x, y|$X_m$, $Y_n$) into the gray values 56 and obtains the gray value 56 (x, y|$X_1$, $Y_1$) to the gray value 56 (x, y|$X_m$, $Y_n$). The control device 100 generates the mapping image 542 by mapping each of the gray values 56 (x, y|$X_1$, $Y_1$) to 56 (x, y|$X_m$, $Y_n$) in the XY coordinate. Besides, in FIG. 10, in order to make it easy to understand how the gray values 56 are mapped, the gray values 56 are shown as images having a predefined area (the same applies to FIG. 11).

The control device 100 outputs the reflection profile information 72 by displaying the mapping image 542 on the display portion 102. Besides, an output destination of the mapping image 542 is, but not limited to, for example, the display portion 102 connected to the control device 100, and can also be a printer, the PLC 200, or a portable terminal or the like.

The feature amounts p are values showing intensities of the light reflected at the attention sites A and incident to the camera 8 among the light incident to the object W from the partial regions 43 set on the light emission surface 40. Therefore, the user can intuitively grasp, based on the mapping image 542, effects of the light irradiated from which irradiation position are strong when the images of the attention sites A are generated. For example, in a case that the images have darker colours when the feature amounts p are greater, the user can intuitively grasp from the mapping image 542 that, images including great feature amounts can be obtained by making the partial regions 43 which are set in the positions mapped by the images with darker colours emit light.

<Determination of Illumination Conditions Using Reflection Profile Information 72>

The reflection profile information 72 is the information showing the relationships between the positions within the light emission surface 40 and the degrees of the light reflected at the attention sites A of the object W and incident to the camera 8 with respect to the light irradiated to the object W from the positions. Therefore, when the illumination conditions at the time of performing an image measurement are set, it can be predicted from the reflection profile information 72 which direction it is from which the light is incident to the attention sites A to obtain images suitable as the images used in the image measurement. In the following, description is made on a setting method of the illumination conditions using the reflection profile information 72 when the image measurement of the attention sites A is performed.

Figure 11:
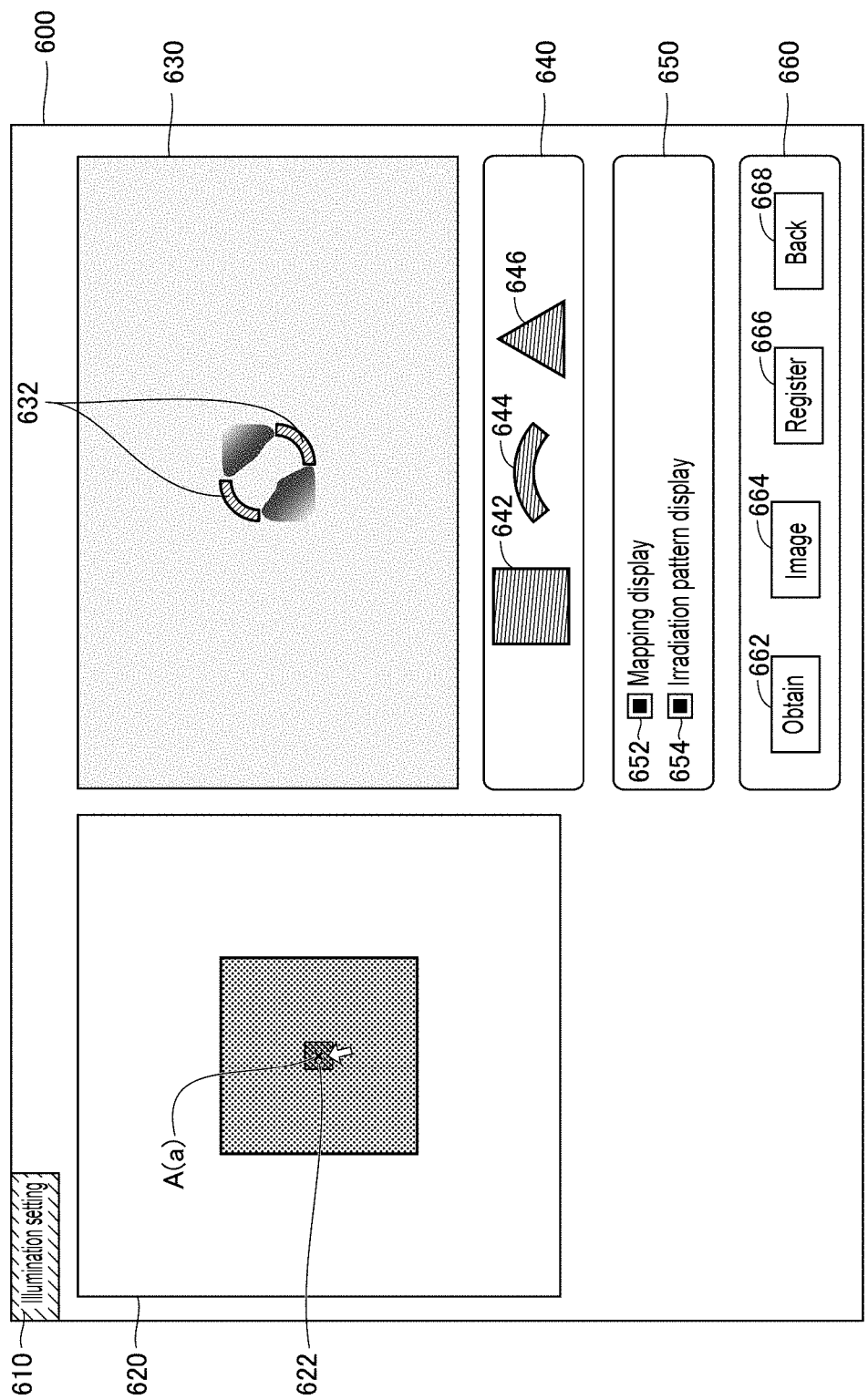
FIG. 11 is a diagram showing one example of a user interface screen at the time of setting.

FIG. 11 is a diagram showing one example of a user interface screen 600 during the setting. The user interface screen 600 shown in FIG. 11 is displayed in the display portion 102 by selecting an illumination setting tab 610. Besides, in FIG. 10, although tabs other than the illumination setting tab 610 are omitted, the tabs relating to other settings such as a "camera setting" tab for setting the camera 8, an "image processing setting" tab for setting the processing contents executed on the obtained images and so on may also be arranged.

The user interface screen 600 includes an image display region 620, an edition region 630, a tool selection region 640, a display selection region 650 and an instruction region 660.

The image display region 620 is a region which displays the image of the imaging visual field 81 captured by the camera 8. The user operates a mouse or the like, which is one example of the input portion 104, and selects the attention position a corresponding to the attention site A from the image displayed on the image display region 620. In FIG. 11, a region including the selected attention site A is displayed on the image display region 620 as a selection region 622. Besides, the attention site A may show a certain prescribed position or show a predefined range. That is, the attention position a corresponding to the attention site A may be configured by one pixel or be configured by a plurality of pixels. Besides, the selection region 622 is desirable to be a shape corresponding to a range of the attention position a. For example, when the attention position a is configured by one pixel, the selection region 622 is shown by a point, and when the attention position a is configured by a plurality of pixels, the selection region 622 is shown by a region of a predefined range.

The edition region 630 is a region in which the mapping image 542 of the attention position a which is selected by an operation to the image display region 620 can be displayed, and is a region for setting the illumination conditions based on the displayed mapping image 542. That is, the display which shows the position (the attention position a) of the attention site A within the imaging visual field 81 and the mapping image 542 of the attention site A which is selected by the operation to the image display region 620 are displayed on the same user interface screen 600. Therefore, the user can easily grasp the mapping image 542 being displayed is the mapping image 542 with respect to the attention site A in which position (attention position a) within the imaging visual field 81.

The coordinate system of the mapping image 542 is a coordinate system showing the light emission surface 40. That is, the coordinate system of the edition region 630 is also the coordinate system showing the light emission surface 40. For example, the user can operate the input portion 104 to use a square tool 642, a sectorial tool 644, a triangular tool 646 or the like displayed in the tool selection region 640 to plot the region (the light emission region) which emits light within the edition region 630 displayed in the coordinate system showing the light emission surface 40. At this moment, a light emission region 632 is plotted in the mapping image 542. In other words, when a designation of the light emission region is received from the input portion 104, the received light emission region is reflected in the mapping image 542. Besides, although the light emission region which is a light emission range is designated to the edition region 630, as long as the light emission region can be designated to the coordinate system on the light emission surface 40, the designated light emission range may not be displayed on the mapping image 542. The designation of the light emission range means designating the light emission intensities for every position on the light emission surface 40. Besides, in FIG. 11, an example is shown in which the designation of whether the light is emitted is received as the light emission intensities, and the light emission intensities can also be adjusted.

By reflecting the designated light emission range on the mapping images 542, when the images of the attention positions a are obtained by the irradiation patterns in which the designated light emission range is lighted up, the light emission range can be designated while confirming the images showing what kind of feature amounts p are obtained.

In addition, as shown in FIG. 11, the image display region 620 and the edition region 630 are regions adjacent to one another. That is, the image of the imaging visual field 81 and the image of the mapping image 542 are displayed side by side. Therefore, the user can easily grasp the mapping image 542 is the mapping image 542 with respect to the attention site A of which position (attention position a) within the imaging visual field 81.

The tool selection region 640 is a region for selecting the tool (the square tool 642, the sectorial tool 644 and the triangular tool 646) used for plotting the light emission region 632. The user can select the tool by moving the cursor to the tool to be used for plotting the light emission region 632 and clicking. The user can use the selected tool to designate the light emission range.

The display selection region 650 is a region for determining contents display in the edition region 630. In the display selection region 650, a mapping display tab 652 and an irradiation pattern display tab 654 are arranged. If the mapping display tab 652 is selected, the mapping image 542 of the attention site A which is selected in the image display region 620 is displayed in the edition region 630. If the irradiation pattern display tab 654 is selected, the irradiation pattern which is set for the attention site A selected in the image display region 620 is displayed in the edition region 630. The selection may be performed to both of the mapping display tab 652 and the irradiation pattern display tab 654, and if both are selected, the mapping image 542 and an image (the light emission region 632) which shows the region of a registered light emission range are overlapped and displayed in the edition region 630.

The instruction region 660 includes an obtainment button 662, an imaging button 664, a register button 666 and a back button 668.

The obtainment button 662 is a button for making each of the plural types of partial regions 43 emit light and generating the reflection profile information 72 by the above-described method. If it is detected that the obtainment button 662 is selected, the control device 100 executes the processing for generating the reflection profile information 72. In addition, when the obtainment button 662 is selected, the attention site A (the attention position a) is selected in the image display region 620, and when the mapping display tab 652 is selected in the display selection region 650, the control device 100 updates the display of the edition region 630 to the mapping image 542 for the attention site A which is selected.

The imaging button 664 is a button for taking images in a state that the range within the light emission surface 40 set in the edition region 630 is made to emit light. The control device 100 instructs, based on the detection that the imaging button 664 is selected, the illumination device 4 to irradiate the light by the irradiation patterns which make the light emission region 632 displayed in the edition region 630 emit light, and instructs the camera 8 to take images under the irradiation patterns.

The register button 666 is a tab for registering the irradiation patterns which make the light emission region 632 displayed in the edition region 630 emit light as the irradiation patterns of the attention site A (the attention position a shown by the selection region 622) selected in the image display region 620. The back button 668 is a button for cancelling without registering the irradiation patterns displayed in the edition region 630. When the back button 668 is selected, for example, the user interface screen 600 is deleted from the display portion 102.

In this way, the user can set the attention position a within the imaging visual field 81, and set the illumination conditions corresponding to reflection characteristics of the attention site A corresponding to the selected attention position a. For example, when any region on the light emission surface 40 is made to emit light by the mapping image 542 displayed in the display portion 102, the user can recognize whether images including or not including the feature amounts p are obtained, and can set the illumination conditions for obtaining the images including or not including the feature amounts p via the input portion 104. The control device 100 associates the irradiation patterns which are the set illumination conditions with the attention positions a of the attention sites A within the imaging visual field 81 for storage. Besides, the control device 100 may also associates the irradiation patterns which are the set illumination conditions with the position of the attention sites A within the object W for storage, and prescribe the position (the attention positions a) within the imaging visual field 81 from an arrangement situation of the object W within the imaging visual field 81 and the position of the attention sites A within the object W.

(One Example of Image Measurement Method)

Figure 12:
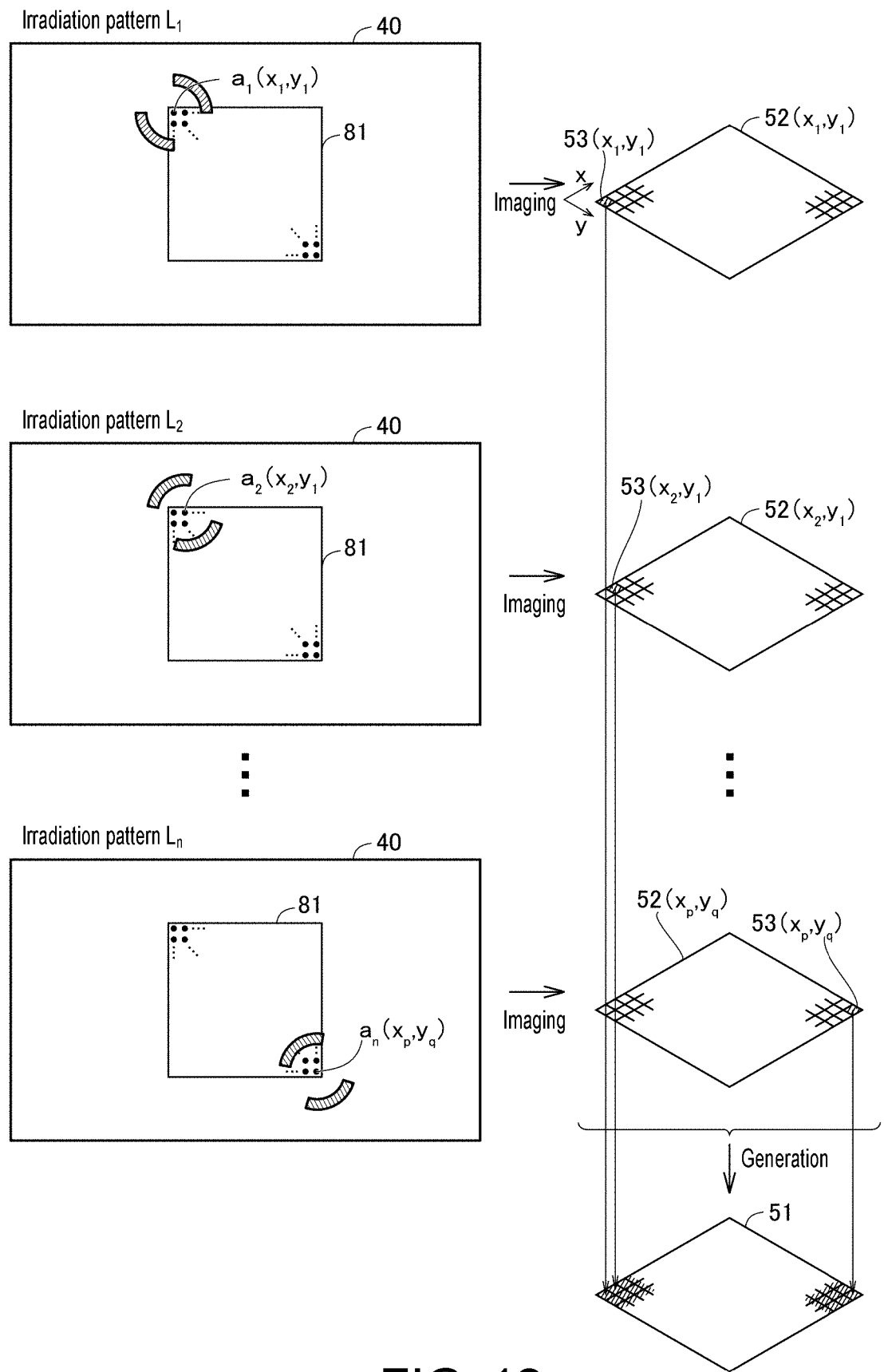
FIG. 12 is a diagram for describing one example of a generation method of an inspection image.

The user can set a plurality of attention positions a within the imaging visual field 81 and set irradiation patterns L which are the illumination conditions according to the reflection characteristics of the attention sites A corresponding to each of the plurality of attention positions a. With reference to FIG. 12, a generation method of an inspection image 51 which is generated using the irradiation patterns L is described. Here, the inspection image 51 is an image used in the image measurement executed by the image processing system 1. FIG. 12 is a diagram for describing one example of the generation method of the inspection image 51.

The control device 100 controls the illumination device 4 to sequentially change the irradiation patterns of the light irradiate from the illumination device 4, and controls the camera 8 to image the object W under each irradiation pattern. The control device 100 performs the appearance inspections of the object W based on the inspection image 51 generated from the plurality of images which are captured in each of the plurality of irradiation patterns.

The irradiation patterns L are set for each attention position a (x, y) within the imaging visual field 81 of the camera 8. Here, (x, y) means coordinate values of the attention positions a within the imaging visual field 81. The inspection image 51 used in the appearance inspections is generated from a plurality of original images 52 which are captured and obtained respectively under each irradiation pattern L. The images of the attention positions a within the inspection image 51 are generated from the original images 52 which are captured under the irradiation patterns L set in association with the attention positions a.

In the example shown in FIG. 12, the attention position $a_1$ $(x_1, y_1)$ to the attention position $a_n$ $(x_p, y_q)$ are set as the attention positions a within the imaging visual field 81. The irradiation patterns L are set for every attention position a. The control device 100 obtains the original image 52 $(x_1, y_1)$ to the original image 52 $(x_p, y_q)$ which are captured under the irradiation pattern $L_1$ to the irradiation pattern $L_n$.

The control device 100 generates the inspection image 51 from the plurality of original image 52 $(x_1, y_1)$ to the original image 52 $(x_p, y_q)$ that are obtained. The control device 100 generates an image of the attention position a1 $(x_1, y_1)$ within the inspection image 51 based on an extraction image 53 $(x_1, y_1)$ which includes the position $(x_1, y_1)$ within the original image 52 $(x_1, y_1)$. Similarly, the control device 100 generates an image of the attention position $a_2$ ($x_2$, $y_1$) within the inspection image 51 based on the extraction image 53 ($x_2$, $y_1$), and generates an image of the attention position $a_n$ ($x_p$, $y_q$) within the inspection image 51 based on the extraction image 53 ($x_p$, $y_q$).

In other words, the inspection image 51 is generated from the extraction image 53 ($x_1$, $y_1$) to the extraction image 53 ($x_p$, $y_q$). Pixels included in the extraction images 53 may be one pixel or a plurality of pixels. Ranges of the extraction images 53 are set corresponding to distances between the attention positions a and the attention positions adjacent to the attention positions a, and are set in a manner that one inspection image 51 is generated from the extraction image 53 ($x_1$, $y_1$) to the extraction image 53 ($x_p$, $y_q$). Besides, the ranges of the extraction images 53 can also be set so that the extraction images 53 overlap with one another. On this occasion, pixel information of overlapped parts is generated based on more than two overlapped extraction images 53.

The irradiation patterns L set for the attention positions a are set according to the reflection characteristics of the attention sites A of the object corresponding to the attention positions a. Therefore, the attention sites A can be measured based on the images captured under the illumination conditions suitable for the reflection characteristics of the attention sites A. In this way, images can be captured under the illumination conditions which are suitable for the reflection characteristics of each of a plurality of attention sites A on the object W, so that the image measurement with a high precision can be performed.

(Function Configuration of Control Device 100)

Figure 13:
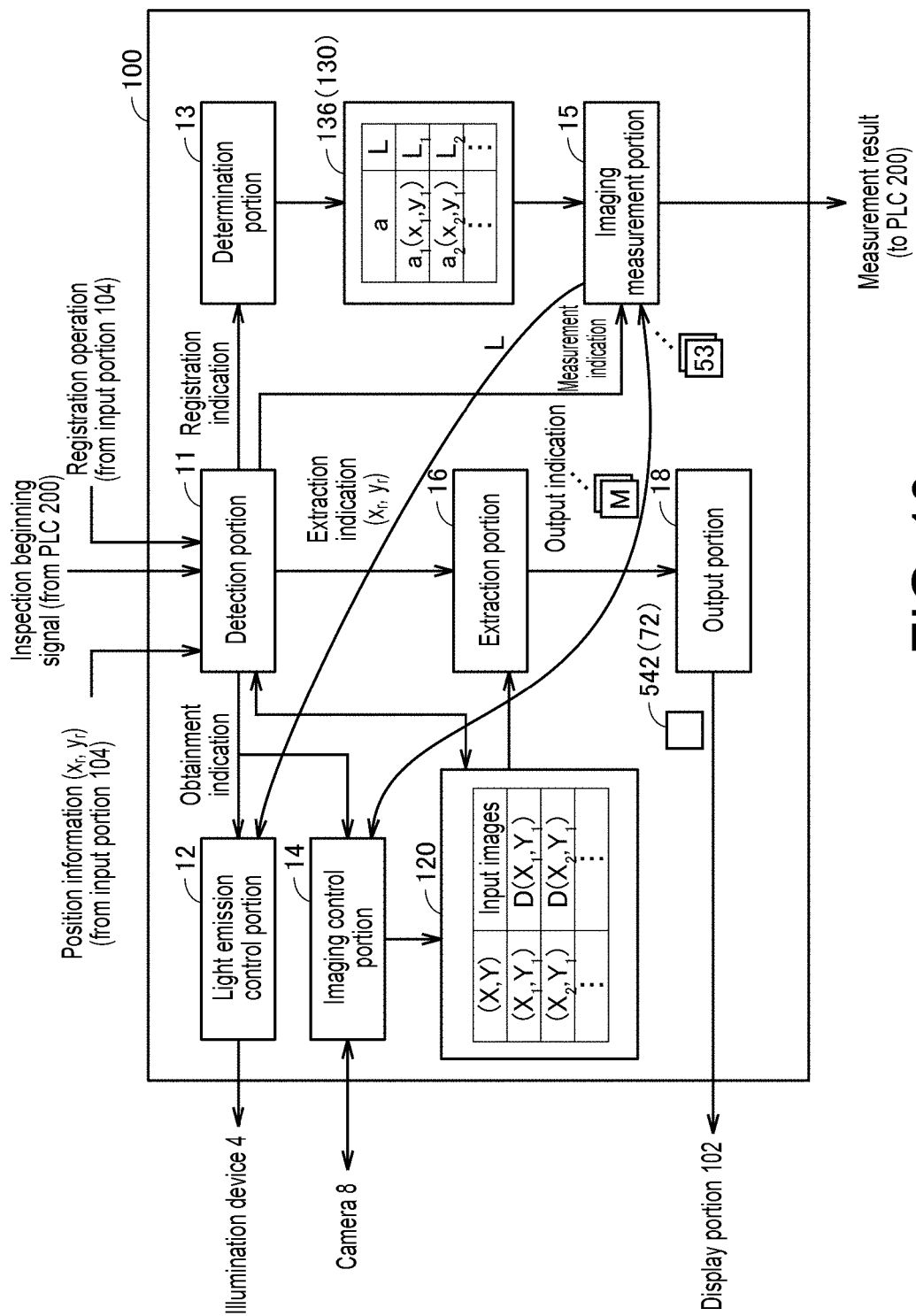
FIG. 13 is a diagram schematically showing a function configuration of the control device.

FIG. 13 is a diagram schematically showing a function configuration of the control device 100. The control device 100 controls each configuration shown in FIG. 13 to set the irradiation patterns by executing the setting program 134.

The control device 100 includes, for example, the light emission control portion 12, the imaging control portion 14, a detection portion 11, an extraction portion 16 and the output portion 18.

The detection portion 11 detects the designation of the position ($x_r$, $y_r$) within the imaging visual field 80, which is input from the input portion 104. For example, if the obtainment button 662 shown in FIG. 10 is operated, the detection portion 11 judges whether the input images D, which are necessary for obtaining the mapping image 542, are saved in the main memory 120, and if not saved, the light emission control portion 12 and the imaging control portion 14 are notified of the fact that an obtainment instruction has been made to execute the process Ph1 for obtaining the input images D. The light emission control portion 12 and the imaging control portion 14 function as obtainment portions for executing the process Ph1.

The light emission control portion 12 controls, according to the obtainment instruction, the illumination device 4 to make the plurality of partial regions 43 which is set on the light emission surface 40 sequentially emit light.

The imaging control portion 14 controls the camera 8 to sequentially generate the images of the imaging visual field 81 corresponding to the sequential light emission of the partial regions 43. The imaging control portion 14 associates the input images D generated by the camera 8 with the positions (X, Y) on the light emission surface 40 of the partial regions 43 which emit light when the input images D are captured, and saves the association in the main memory 120 which is on kind of a storage portion.

When it is judged that the input images D which are necessary for obtaining the mapping image 542 are saved in the main memory 120, the detection portion 11 instructs the extraction portion 16 to extract the partial images M which are corresponding to the position ($x_r$, $y_r$) input from the input portion 104 (an extraction instruction). The position ($x_r$, $y_r$) input from the input portion 104 is a position of the attention position a within the imaging visual field 81, and is the position (x, y) of the selection region 622 within the image display region 620.

The extraction portion 16 extracts, according to the extraction instruction, the partial images M which are corresponding to the positions of the camera coordinate (x, y) from each of the plurality of input images D saved in the main memory 120. If the partial images M are extracted, the extraction portion 16 instructs the output portion 18 to output the mapping image 542 for the designated attention position a (an output instruction).

The output portion 18 outputs, according to the output instruction, the reflection profile information 72 as the mapping images 542, and in the reflection profile information 72, the feature amounts p shown by the partial images M is associated with the positions (X, Y) of the partial regions 43 which emit light when the input images D being extraction origins of the partial images M are generated. Specifically, the output portion 18 displays the mapping image 542 on the display portion 102, wherein the mapping image 542 is mapped with the gray values 56 (x, y|X, Y) at the corresponding positions (X, Y) on the XY coordinate, and the gray values 56 (x, y|X, Y) corresponds to the magnitude of the feature amounts p (x, y|X, Y) which are shown by the partial images M (X, Y|x, y) of the attention positions a (x, y) extracted from the input images D (X, Y) corresponding to the positions (X, Y).

The control device 100 may further include a determination portion 13 that determines the irradiation patterns for every attention position a and stores the irradiation patterns in the hard disk 130 as inspection information 136. If it is detected that the register button 666 of FIG. 10 is operated, the detection portion 11 instructs the determination portion 13 to register the irradiation patterns (register instruction).

The determination portion 13 associates, at a timing when the register button 666 is operated, the attention positions a (x, y) designated in the image display region 620 with the irradiation patterns L set in the edition region 630 for a determination and stores the association as the inspection information 136 in the hard disk 130.

The control device 100 includes an imaging measurement portion 15 for performing the image measurement. The detection portion 11 detects that a signal (an inspection start signal) which shows that the object W is conveyed to the predefined inspection position has been notified from the PLC 200. If the inspection start signal is detected, the detection portion 11 instructs the imaging measurement portion 15 to start the image measurement (a measurement instruction).

The imaging measurement portion 15 performs the image measurement in accordance with the inspection information 136 stored in the hard disk 130. Specifically, the imaging measurement portion 15 instructs the imaging control portion 14 in a manner that the irradiation patterns L is set in the light emission control portion 12 in accordance with the inspection information 136 and to generate the extraction images 53 of the positions (x, y) corresponding to the attention positions a which are corresponding to the set irradiation patterns L. Accordingly, the imaging measurement portion 15 obtains a plurality of extraction images 53, generates the inspection image 51 based on the obtained extraction images 53 and measures an appearance of the object W based on the generated inspection image 51.

Besides, the inspection image 51 is generated from a plurality of extraction images 53, so that it can also be said that the imaging measurement portion 15 performs the image measurement of a region including the attention positions a based on the extraction images 53 of the attention positions a corresponding to the irradiation patterns L. An image measurement result that is obtained is transmitted to the PLC 200 or the like.

<Flowchart>

Figure 14:
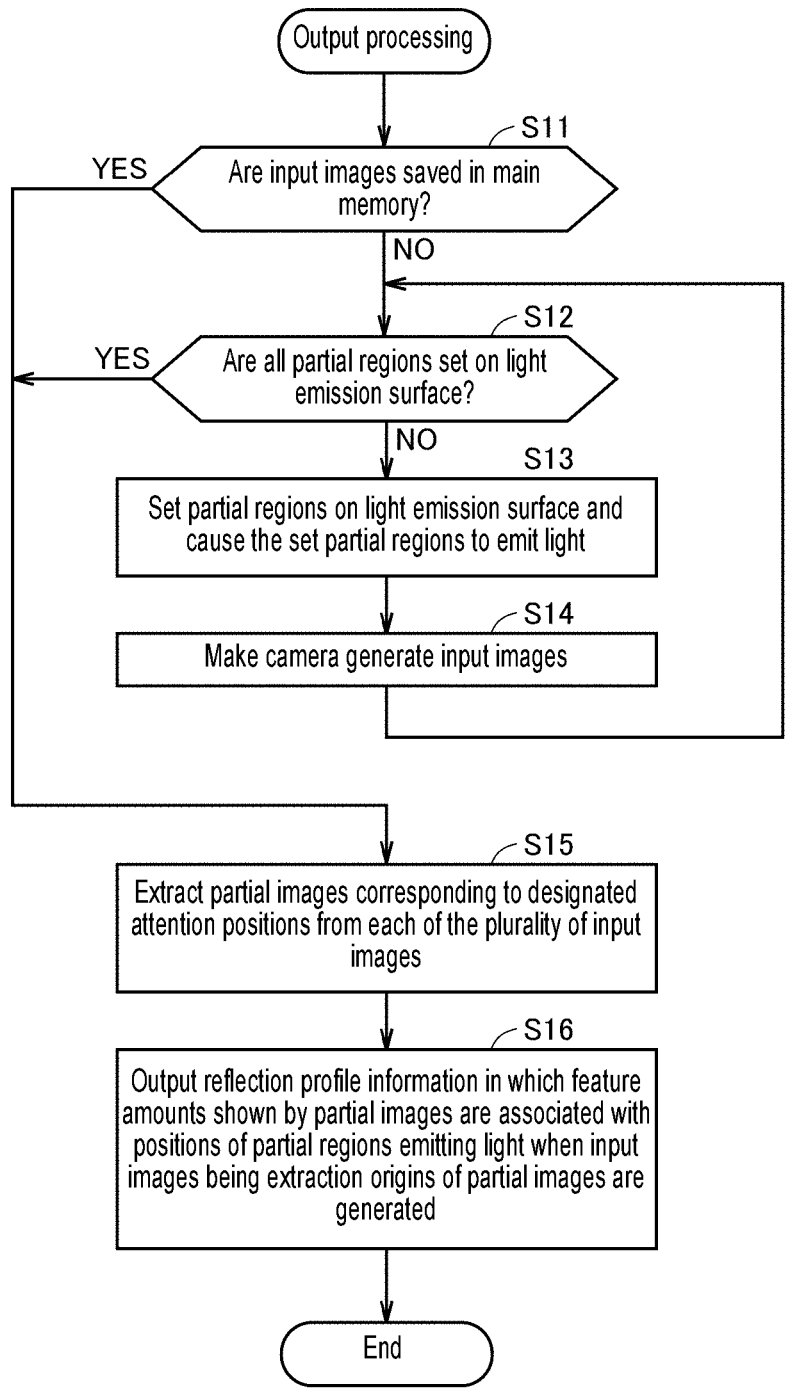
FIG. 14 is a flowchart of processing of outputting the reflection profile information of a designated attention position.

FIG. 14 is a flowchart of the processing of outputting the reflection profile information 72 of the designated attention position a. The processing of outputting the reflection profile information 72 is a processing which is implemented by the CPU 110 developing the setting program 134 in the main memory and executing the setting program 134. The processing of outputting the reflection profile information 72 is executed every time the obtainment button 662 is operated.

In step S11, the CPU 110 judges whether the input images D are saved in the main memory 120. When it is judged that the input images D are not saved in the main memory 120 ("NO" in step S11), the CPU 110 switches the processing to step S12.

In step S12, the CPU 110 judges whether all the partial regions 43 are set on the light emission surface 40. All the partial regions 43 mean all of the plural types of partial regions 43 set in advance. For example, the CPU 110 judges whether each partial region 43 which is set in different positions on the light emission surface 40 is set to all the positions that are set. When all of the plural types of partial regions 43 emit light, the plural types of partial regions 43 may be set in a manner that the range on the light emission surface 40 of the predefined range emits light. The predefined range is a range arbitrarily set according to a size of the object W, the imaging visual field 81 or the like. When it is judged that there are partial regions 43 which are not set on the light emission surface 40 ("NO" in step S12), the CPU 110 switches the processing to step S13.

In step S13, the partial regions 43 are set on the light emission surface 40 and the set partial regions 43 are caused to emit light.

In step S14, the CPU 110 makes the camera 8 generate the input images D. The CPU 110 repeats step S13 and step S14 until it is judged to be "YES" in step S12. Accordingly, the CPU 110 can make each of the plural types of partial regions 43 emit light, and can generate the input images D in synchronization with the light emission of each of the plural types of partial regions 43.

When it is judged that the input images D are saved in the main memory 120 ("YES" in step S11), or it is judged that all the partial regions 43 are set on the light emission surface 40 ("YES" in step S12), the CPU 110 switches the processing to step S15.

In step S15, the CPU 110 extracts the partial images M which are corresponding to the designated attention positions a from each of a plurality of input images D.

In step S16, the CPU 110 outputs the reflection profile information 72 in which the feature amounts p shown by the partial images M are associated with the positions of the partial regions 43 which emit light when the input images D being the extraction origins of the partial images M are generated.

E. Second Specific Example

The reflection profile information 72 in the first specific example is the information in association with the positions on the light emission surface 40. The reflection profile information 74 in the second specific example is different from the reflection profile information 70 in that the reflection profile information 74 is information in association with relative positions (i, j) with respect to the positions (the attention positions a) within the imaging visual field of the attention sites A. Besides, the imaging method of the input images D, the extraction method of the partial images M and the extraction method of the feature amounts p are in common with the reflection profile information 70, so that the description is partially omitted.

(About Relative Positions)

Figure 15:
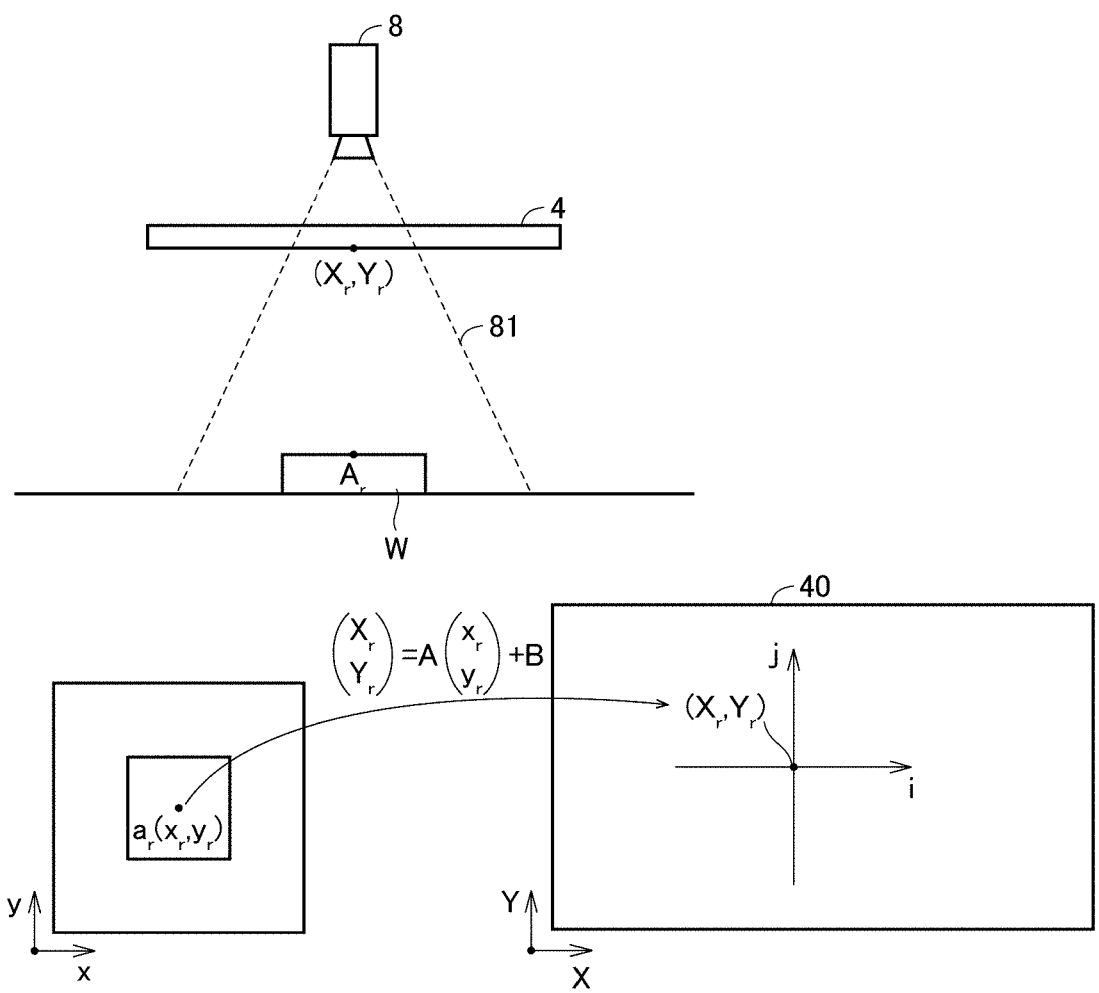
FIG. 15 is a diagram for describing relative positions.

The relative positions are described. The relative positions are represented by an ij coordinate. FIG. 15 is a diagram for describing the relative positions. Specifically, the ij coordinate is a coordinate which takes the position on the light emission surface 40 having a correspondence relationship with the attention position a as a reference position. Here, the reference position means, for example, an origin (0, 0). For example, a relationship of a formula (1) is established between the attention position $a_r$ ($x_r$, $y_r$) of the attention site $A_r$ within the camera coordinate system and a corresponding position ($X_r$, $Y_r$) on the light emission surface 40. Therefore, the corresponding position ($X_r$, $Y_r$) on the light emission surface 40 can be obtained from the attention position $a_r$.

(Expression 1)

$$\begin{pmatrix} X_r \\ Y_r \end{pmatrix} = A \begin{pmatrix} x_r \\ y_r \end{pmatrix} + B \qquad (1)$$

Coefficients A, B are calibration parameters, and can be calculated by calculation based on a position relationship between the camera 8 and the illumination device 4 after the positions of the camera 8 and the illumination device 4 are fixed, or obtained by performing a calibration operation. Besides, the formula (1) is one example, and the positions on the light emission surface 40 which are corresponding to the positions within the camera coordinate system can also be defined in advance without using the formula (1).

<Calibration Method>

One example of a calibration method for obtaining the correspondence relationships between the attention positions a and the positions (X, Y) on the light emission surface 40 is described. The attention positions a correspond to the positions (x, y) within the imaging visual field 81, so that the correspondence relationships between the positions (X, Y) on the light emission surface 40 and the positions (x, y) within the imaging visual field 81 are obtained by calibration.

The control device 100 sequentially sets the partial regions 43 to different positions on the light emission surface 40 and makes the partial regions 43 emit light, and controls the camera 8 to sequentially generate the images of the imaging visual field 81 corresponding to the sequential light emission. In the inspection position, a reference object called a target plate for the calibration may be disposed to perform the calibration, or the object W which is an inspection target may be disposed to perform the calibration.

The control device 100 extracts the luminance values from each of the plurality of pixels included in the plurality of images which is obtained corresponding to the sequential lighting up. The control device 100 compares the luminance values of the pixels positioned in (x, y) within the plurality of images, and prescribes the pixels which have the highest luminance values. The control device 100 associates the position (X, Y) where the partial regions 43 are set when the images corresponding to the prescribed pixels are obtained with the positions (x, y) of the pixels within the images. The control device 100 can obtain correspondence relationships between the camera coordinate system and the illumination coordinate system by performing the same processing to all the pixels within the obtained images. Calibration parameters may be calculated by making the correspondence relationships between the camera coordinate system and the illumination coordinate system linearly approximated. Besides, the processing described above is performed for every pixel, and the processing described above can also be performed for every plural pixels taking the plural pixels as one unit.

Because the calibration is performed as described above, the light irradiated from the positions (X, Y) on the light emission surface 40 corresponding to the attention positions a can be said to be the light having the highest light amount reflected at the attention positions a and incident to the camera 8 among the light incident to the attention positions a.

<Generation of Reflection Profile Information 74>

Figure 16:
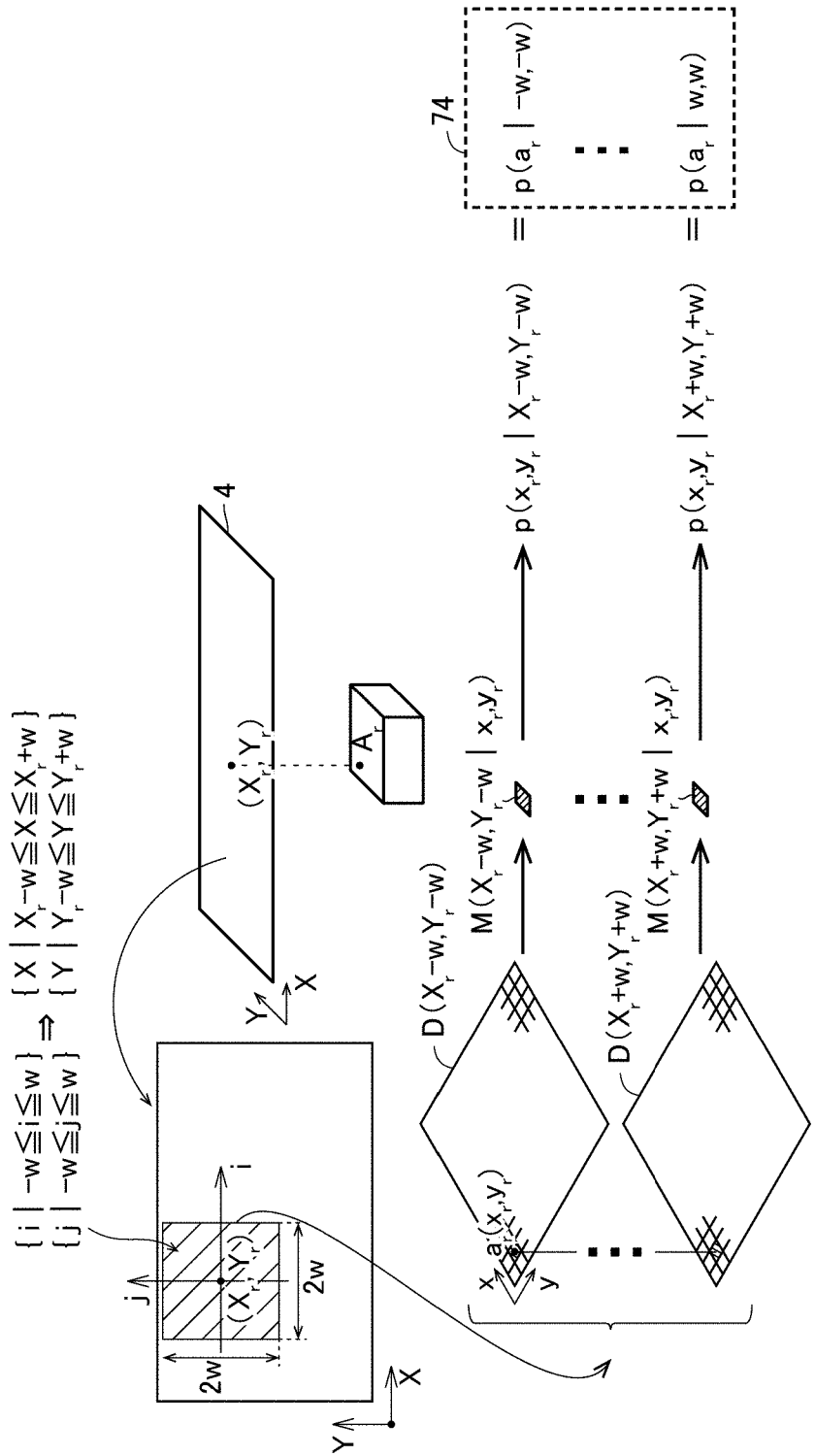
FIG. 16 is a diagram showing a generation method of reflection profile information in a second specific example.

FIG. 16 is diagram showing a generation method of the reflection profile information 74 in the second specific example. Besides, the obtainment methods of the input images D, the partial images M, and the feature amounts p which are used for generating the reflection profile information 74 are in common with the first specific example, so that the description is partially omitted.

The range of the feature amounts p which are included in the reflection profile information 74 in the second specific example is set to a range shown in a formula (2).

(Expression 2)

$$\{i | -\overline{\omega} \leq i \leq \overline{\omega}\}$$

$$\{j | -\overline{\omega} \leq j \leq \overline{\omega}\} \quad (2)$$

In an example shown in FIG. 16, the reflection profile information 74 of the attention position $a_r$ ($x_r$, $y_r$) within the imaging visual field 81 is generated. The control device 100 generates the input images D included in the range shown in the formula (3), and extracts a partial image M of the attention position $a_r$ ($x_r$, $y_r$) from each input image D. Specifically, the control device 100 extracts the partial image M of the attention position $a_r$ ($x_r$, $y_r$) from each of the input image D ($X_r$−w, $Y_r$−w) to the input image D ($X_r$+w, $Y_r$+w), and extracts the partial image M ($X_r$−w, $Y_r$−w|$x_r$, $y_r$) to the partial image M ($X_r$+w, $Y_r$+w|$x_r$, $y_r$). Besides, the input image D ($X_r$−w, $Y_r$−w) to the input image D ($X_r$+w, $Y_r$+w) can also be obtained by extracting the input images D included in the range shown in the formula (3) from the input image D ($X_1$, $Y_1$) to the input image D ($X_m$, $Y_n$).

(Expression 3)

$$\{X | X_r - \overline{\omega} \leq X \leq X_r + \overline{\omega}\}$$

$$\{Y | Y_r - \overline{\omega} \leq Y \leq Y_r + \overline{\omega}\} \quad (3)$$

Here, the range shown in the formula (3) is defined based on the formula (2). In addition, the input images D of the range shown in the formula (3) mean the input images D which are obtained when the partial regions 43 set within the range shown in the formula (3) emit light.

The control device 100 extracts the feature amounts p from each of the partial image M ($X_r$−w, $Y_r$−w|$x_r$, $y_r$) to the partial image M ($X_r$+w, $Y_r$+w|$x_r$, $y_r$) to generate the reflection profile information 74. Here, if the XY coordinate is converted to the ij coordinate, the feature amount p ($x_r$, $y_r$|$X_r$−w, $Y_r$−w) to the feature amount p ($x_r$, $y_r$|$X_r$+w, $Y_r$+w) can be represented as feature amount p ($a_r$|−w, −w) to the feature amount p ($a_r$|w, w). The feature amount p ($a_r$|−w, −w) can also be referred to as a value based on the light which are among the light incident to the attention site $A_r$ and incident from the position (−w, −w) within the ij coordinate taking the position ($X_r$, $Y_r$) on the light emission surface 40 corresponding to the attention position $a_r$ ($x_r$, $y_r$) as the reference position.

The reflection profile information 74 is different from the reflection profile information 72 in the first specific example in that the reflection profile information 74 is represented not by the XY coordinate on the light emission surface 40, but by the ij coordinate taking the positions on the light emission surface 40 which have correspondence relationships with the attention positions a as the reference positions. Because the reflection profile information 74 is represented by the ij coordinate, the reflection profile information 74 which reflects changes of the position relationship between the light emission surface 40 and the attention sites A can be obtained. As a result, the reflection profile information 74 obtained for every attention site A can be compared with one another in the same dimension regardless of the position relationships between the light emission surface 40 and the attention sites A.

In addition, the range of the feature amounts p included in the reflection profile information 74 is set to the range shown by the formula (2), so that the reflection profile information 74 obtained for every attention site A is the information in the range the same with one another. As a result, the control device 100 can directly compare the reflection profile information 74 obtained for every attention site A with one another.

<Output Method of Reflection Profile Information 74>

Figure 17:
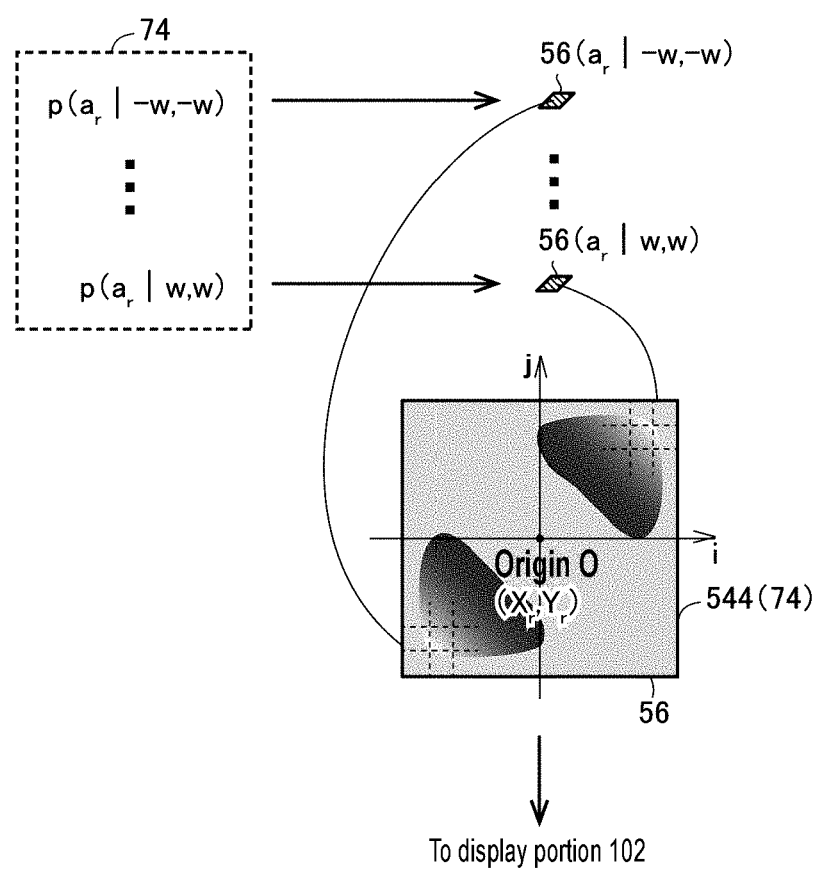
FIG. 17 is a diagram showing an example of outputting the reflection profile information in the second specific example as mapping images.

FIG. 17 is a diagram showing an example of outputting the reflection profile information 74 in the second specific example as a mapping image 544. The control device 100 maps the gray values 56, which are corresponding to the magnitude of the feature amounts p shown by each of the plural partial images M that are extracted, in the ij coordinate taking the position ($X_r$, $Y_r$) as the origin. For example, the gray value 56 ($a_r$|−w, −w) of the feature amount p ($a_r$|−w, −w) is mapped to (−w, −w) within the ij coordinate. Besides, in FIG. 17, in order to make it easy to understand how the gray values 56 are mapped, the gray values 56 are shown as images with predefined areas (the same applies to FIG. 20 and FIG. 21(*a*) to FIG. 21(*d*)).

<Determination Method of Illumination Conditions Using Reflection Profile Information 74>

In the first specific example, the example is shown in which the reflection profile information 70 is used in order to set different irradiation patterns L for each of the plurality of attention positions a set within the imaging visual field 81. The reflection profile information 74 in the second specific example is used for setting a reference irradiation pattern $L_0$. The reference irradiation pattern $L_0$ is an irradiation pattern which is a reference used to determine the irradiation pattern L of every attention position a. In the following, a determination method of the irradiation pattern L of every attention position a using the reference irradiation pattern $L_0$ is described, and a setting method of the reference irradiation pattern $L_0$ is described.

(Method for Determining Irradiation Patterns L from Reference Irradiation Pattern $L_0$)

The control device 100 sets the irradiation patterns L by setting a light emission region shown by the reference irradiation pattern $L_0$ in the positions on the light emission surface 40, which have the correspondence relationships in advance with the attention positions a, when the extraction images 53 corresponding to the attention positions a are obtained.

Figure 18:
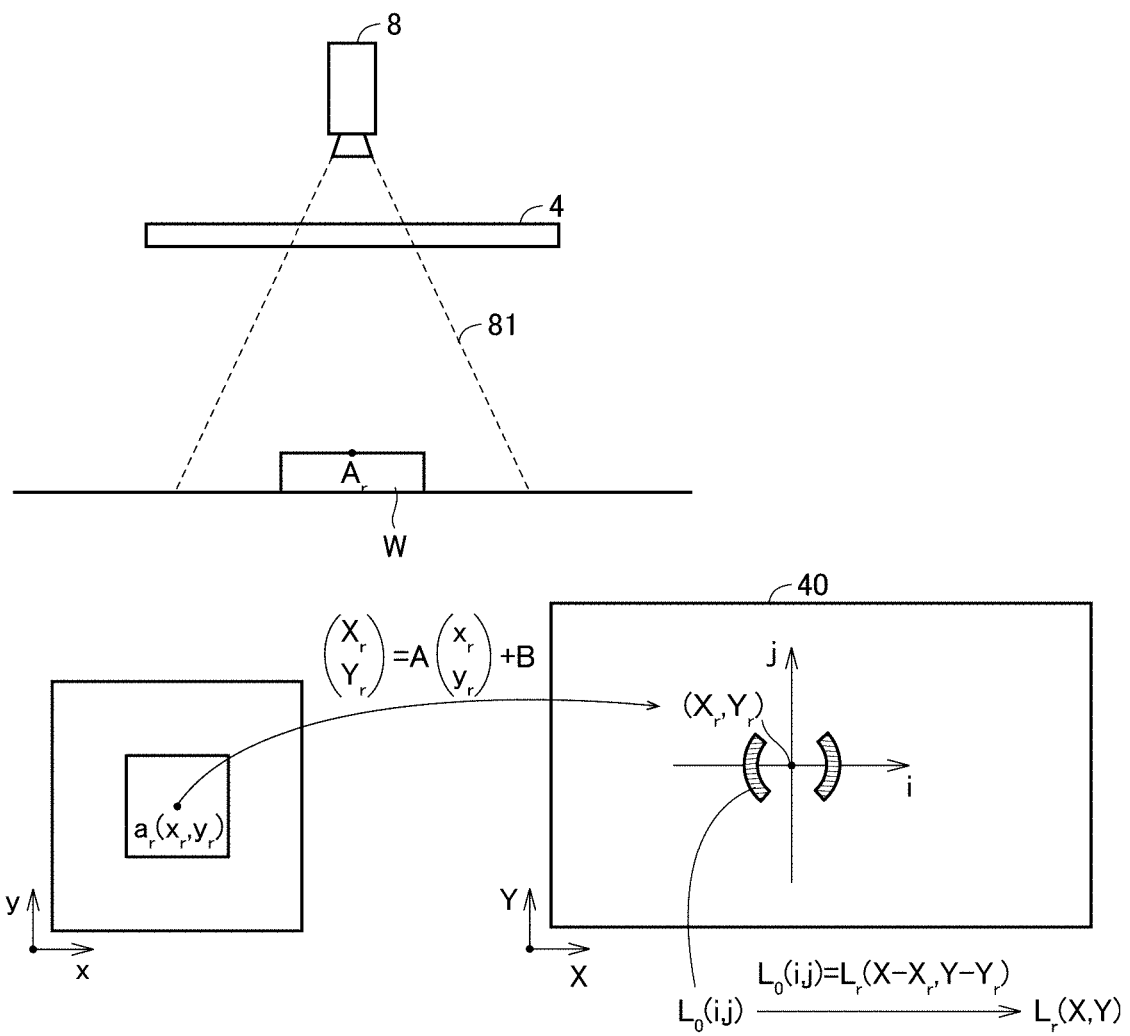
FIG. 18 is a diagram for describing a determination method of an irradiation pattern of every attention position using a reference irradiation pattern.

FIG. 18 is a diagram for describing the determination method of the irradiation pattern L of every attention position a using the reference irradiation pattern $L_0$. The irradiation pattern $L_r$ is determined so that the irradiation pattern $L_0$ is made taking the position $(X_r, Y_r)$ on the light emission surface 40 corresponding to the attention position $a_r$ $(x_r, y_r)$ as a centre. Specifically, when a function showing a shape (the light emission range) of the reference irradiation pattern $L_0$, which is the reference, is defined as $L_0(i, j)$, a relationship of a formula (4) is established between the irradiation pattern $L_r$ and the reference irradiation pattern $L_0$.

(Expression 4)

$$L_0(i,j)=L_r(X-X_r, Y-Y_r) \quad (4)$$

The control device 100 can calculate the irradiation pattern $L_r$ from the attention position $a_r$ $(x_r, y_r)$, the reference irradiation pattern $L_0$, the formula (1) and the formula (4).

Figure 19:
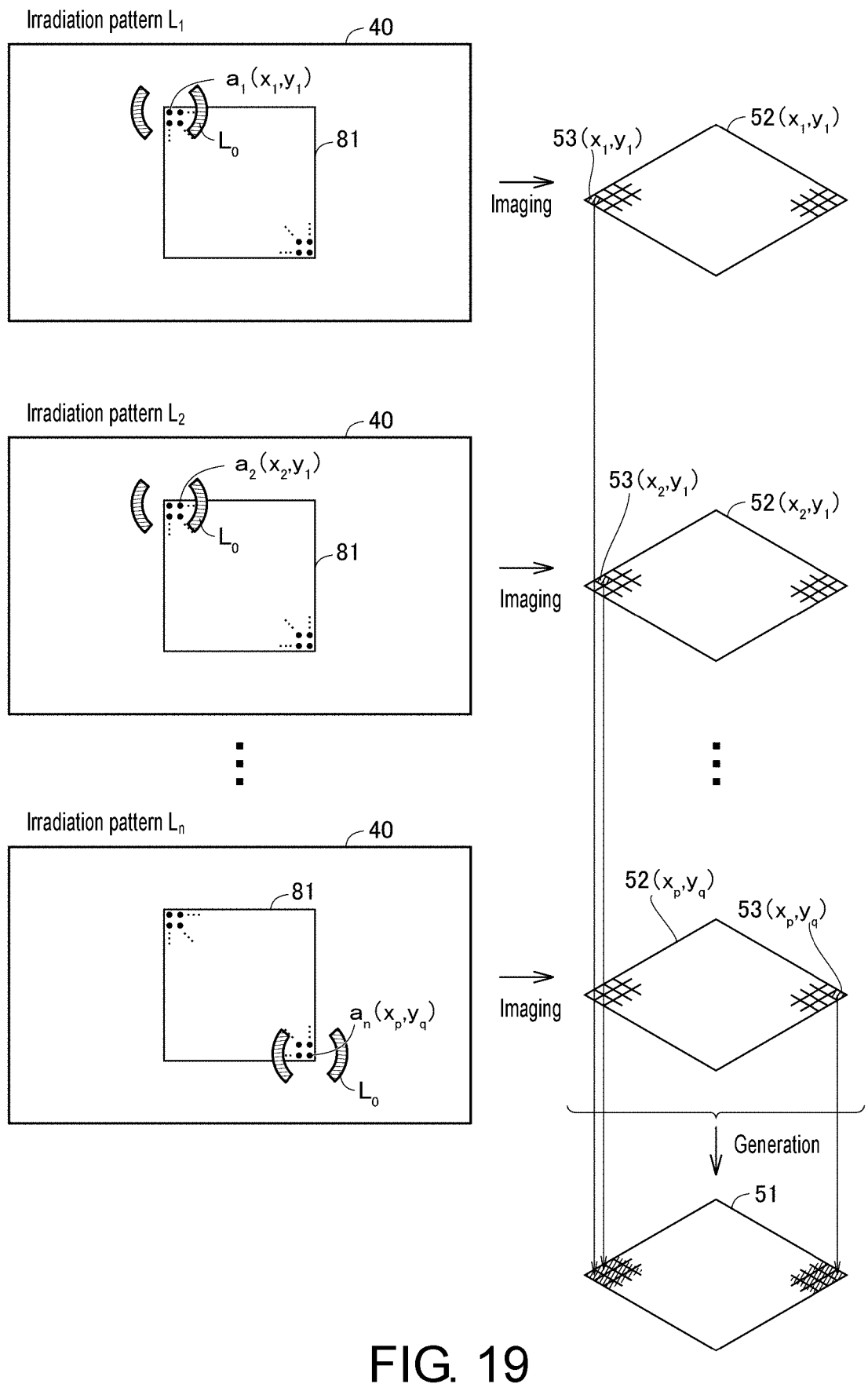
FIG. 19 is a diagram for describing a generation method of the inspection image using the reference irradiation pattern.

FIG. 19 is a diagram for describing a generation method of the inspection image 51 using the reference irradiation pattern $L_0$. The positions $(X, Y)$ on the light emission surface 40 corresponding to the attention positions a are set as reference positions to set the light emission range shown by the reference irradiation pattern $L_0$, and the original images 52 are generated, and the images of the positions which are corresponding to the attention positions a on the inspection image 51 are generated based on the extraction images 53 extracted from the original images 52. That is, the light emission range shown by the reference irradiation pattern $L_0$ is also sequentially set in the different positions on the light emission surface 40 by sequentially changing the attention positions a.

(Setting Method of Reference Irradiation Pattern $L_0$)

Figure 20:
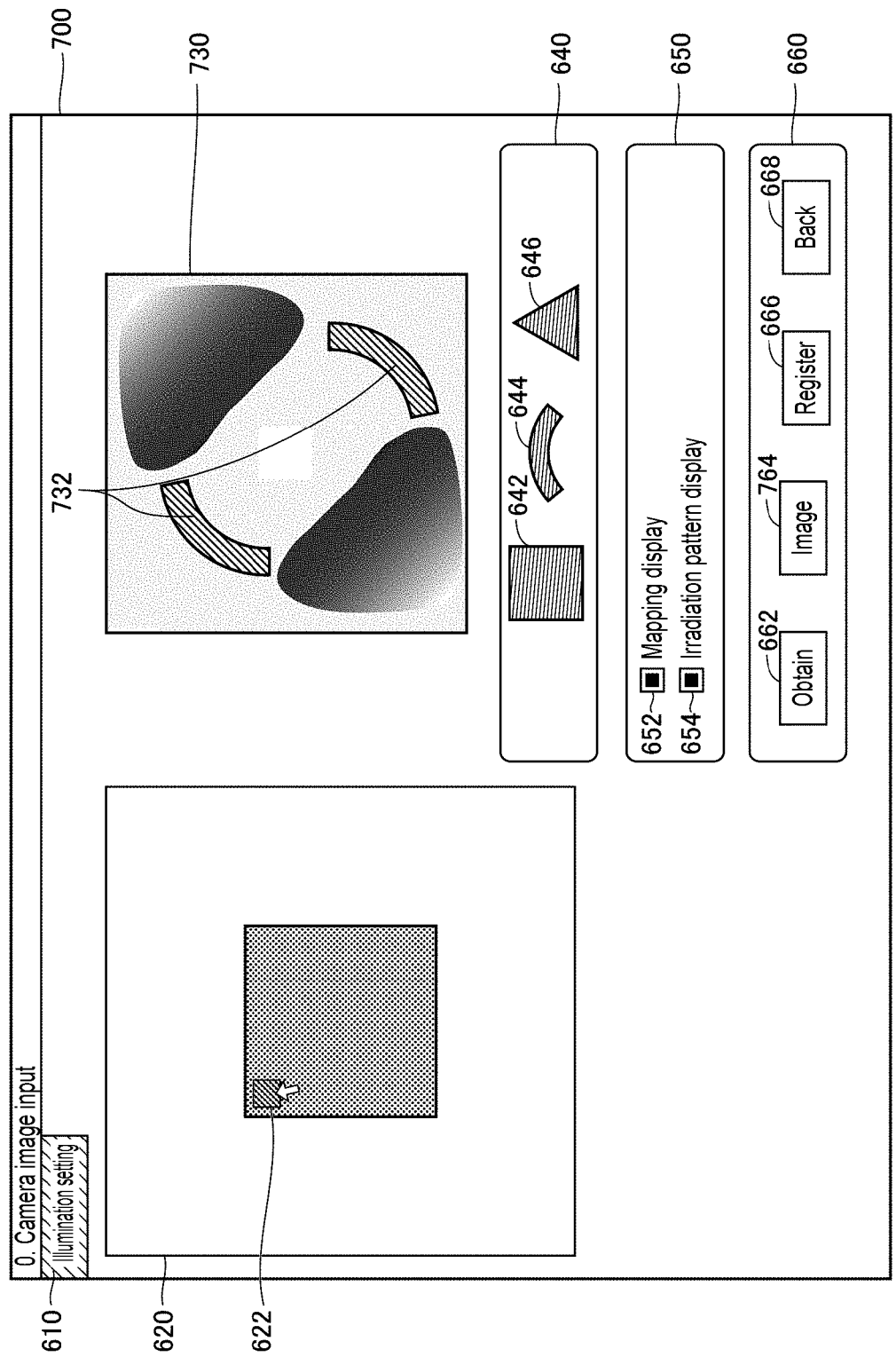
FIG. 20 is a diagram showing a user interface screen at the time of setting the reference irradiation pattern.

FIG. 20 is a diagram showing a user interface screen 700 at the time of setting the reference irradiation pattern $L_0$. Compared with the user interface screen 600 shown in FIG. 11, the user interface screen 700 is different in that the user interface screen 700 includes an edition region 730 in place of the edition region 630, and includes an imaging button 764 in place of the imaging button 664.

The mapping images 544 of the ij coordinate system are displayed in the edition region 730. If the register button 666 is operated, a light emission region 732 which is set in the edition region 730 is saved as the reference irradiation pattern $L_0$.

If the imaging button 764 is operated, the inspection image 51, which is captured and generated under the reference irradiation pattern $L_0$ shown by the light emission region 732 plotted within the edition region 730, is displayed in the image display region 620. Accordingly, the user can judge whether the required image is obtained by the reference irradiation pattern $L_0$ that is set.

FIG. 21(a) to FIG. 21(d) are diagrams showing one example of a flow of setting the reference irradiation pattern $L_0$. The object W shown in FIG. 21(a) to FIG. 21(d) is a metal with machining marks formed on a surface. In the example shown in FIG. 21(a) to FIG. 21(d), the input images D are already obtained. In addition, in FIG. 21(a) to FIG. 21(d), only the image display region 620 and the edition region 730 of the user interface screen 700 are representatively shown.

Scratches to be detected in the image measurement in the attention site $A_1$ of the object W are set to be the scratches on which the machining marks which are not desired to be detected in the image measurement in the attention site $A_2$ are formed. The user operates the input portion 104 to select, based on the images of the object W displayed within an image display region 620, the attention position $a_1$ corresponding to the attention site $A_1$. If the attention position $a_1$ is selected, as shown in FIG. 21(a), the control device 100 displays the mapping image 544 corresponding to the attention position $a_1$ in the edition region 730. The user plots the region (the light emission region 732) which emits light within the edition region 730 displayed by the ij coordinate system.

In the example shown in FIG. 21(a) to FIG. 21(d), a darker colour is shown when the magnitude shown by the feature amounts p is greater, and it is judged that there are scratches if the magnitude shown by the feature amounts p is great. Because the scratches to be detected are formed in the attention position $a_1$, great feature amounts p are desirably extracted from the attention position $a_1$ in the image measurement. Therefore, if the user plots the light emission region 732 to include a part shown by a dark colour, the illumination condition under which the marks like the attention site $A_1$ is easily detected can be set. In FIG. 21(b), an example in which the user plots the light emission region 732 to include the part shown by the dark colour is shown.

Here, when the machining marks like the attention site $A_2$ are imaged, the irradiation patterns under which small feature amounts p are extracted are desirable. If the user operates the input portion 104 to select, based on the images of the object W displayed within the image display region 520, the attention position $a_2$ corresponding to the attention site $A_2$ in a state shown in FIG. 21(b), a state shown in FIG. 21(c) is switched to.

In the edition region 730 shown in FIG. 21(c), the light emission region 732 which is set to easily detect the scratches is plotted in the mapping image 544 corresponding to the attention position $a_2$. The user adjusts, as shown in FIG. 21(d), the light emission region 732 for the edition region 730 shown in FIG. 21(c) so as not to include the part shown by the dark colour.

In this way, the user can set the illumination conditions under which those to be detected as scratches can be detect and those not to be detected are not detected in the image measurement.

<Function Configuration Diagram of Control Device 100 in Second Specific Example>

Figure 22:
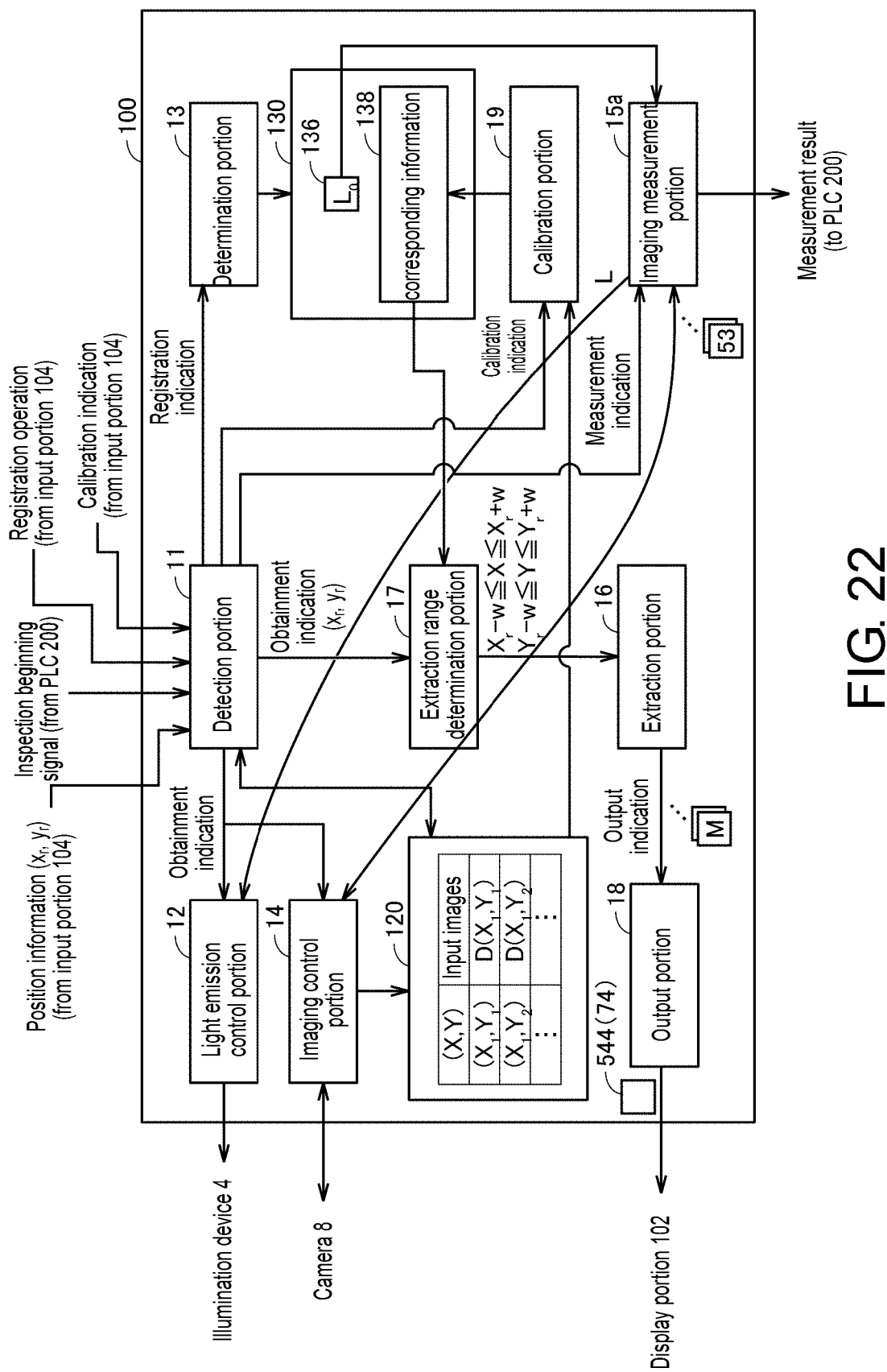
FIG. 22 is a diagram schematically showing a function configuration of the control device in the second specific example.

FIG. 22 is a diagram schematically showing a function configuration of the control device 100 in the second specific example. The control device 100 may include an extraction range determination portion 17 in addition to the function configuration shown in FIG. 13.

The extraction range determination portion 17 determines a range of extraction to create the mapping images 544 in the reference coordinate system (i, j) which takes the position $(X_r, Y_r)$ on the light emission surface 40 corresponding to a camera coordinate $(x_r, y_r)$ that is input as a reference position. Specifically, the extraction range determination portion 17 prescribes the position $(X_r, Y_r)$ on the light emission surface 40 corresponding to the camera coordinate $(x_r, y_r)$ based on corresponding information 138 showing correspondence relationships between camera coordinate positions and the positions on the light emission surface 40, which are stored in a storage portion such as the hard disk 130 or the like. The corresponding information 138 includes, for example, the calibration parameters. The extraction range determination portion 17 determines a range ($X_r-w<X<X_r+w$, $Y_r-w<Y<Y_r+w$) to be extracted with the prescribed position ($X_r$, $Y_r$) as the reference position.

The extraction portion 16 extracts the partial images M in the camera coordinate ($x_r$, $y_r$) from each of the input images D included in the extraction range ($X_r-w<X<X_r+w$, $Y_r-w<Y<Y_r+w$). When extracting the partial images M, the extraction portion 16 instructs the output portion 18 to output the reflection profile information 74 with respect to the designated attention position $a_r$ ($x_r$, $y_r$) as the mapping image 544 (output instruction).

The output portion 18 outputs, according to the output instruction, the feature amounts p shown by the partial images M by associating the positions (X, Y) of the partial regions 43, which emit light when the input images D being the extraction origins of the partial images M are generated, with the relative positions (i, j). The output portion 18 outputs the reflection profile information 74 by displaying, in the display portion 102, the mapping images 544 in which the gray values 56 corresponding to the magnitude of the feature amounts p shown by the partial images M are mapped in the ij coordinate which takes the positions on the light emission surface 40 having the correspondence relationships with the attention positions a as the reference positions.

In addition, if the register button 666 of FIG. 20 is operated, the reference irradiation pattern $L_0$ set in the edition region 630 is stored as the inspection information 136 during the operation of the register button 666.

The control device 100 may further include a calibration portion 19. The calibration portion 19 generates the corresponding information 138. If the detection portion 11 detects an instruction of calibration, an execution of calibration is instructed to the calibration portion 19.

The calibration portion 19 instructs the light emission control portion 12 and the imaging control portion 14 to obtain the input images D, sets the positions on the light emission surface 40 corresponding to each pixel position (x, y) from the obtained input images D and stores the positions as the corresponding information 138 in the hard disk 130 or the like.

In addition, compared with the function configuration shown in FIG. 13, the control device 100 is different in that the control device 100 includes an imaging measurement portion 15a in place of the imaging measurement portion 15. The imaging measurement portion 15a performs the image measurement in accordance with the inspection information 136 stored in the hard disk 130. Specifically, the imaging measurement portion 15a makes the light emission control portion 12 set a light emission range shown by the reference irradiation pattern $L_0$ in different positions (X, Y) on the light emission surface 40 in accordance with the inspection information 136, and instructs the imaging control portion 14 to generate extraction images 53 of the positions (x, y) within the camera coordinate corresponding to the positions (X, Y) on the light emission surface 40 to which the light emission range is set. In this way, the imaging measurement portion 15 obtains a plurality of extraction images 53, generates the inspection image 51 based on the obtained extraction image 53 and measures the appearance of the object W based on the inspection image 51 that is generated. The image measurement result that is obtained is transmitted to the PLC 200 or the like.

<Flowchart in Second Specific Example>

Figure 23:
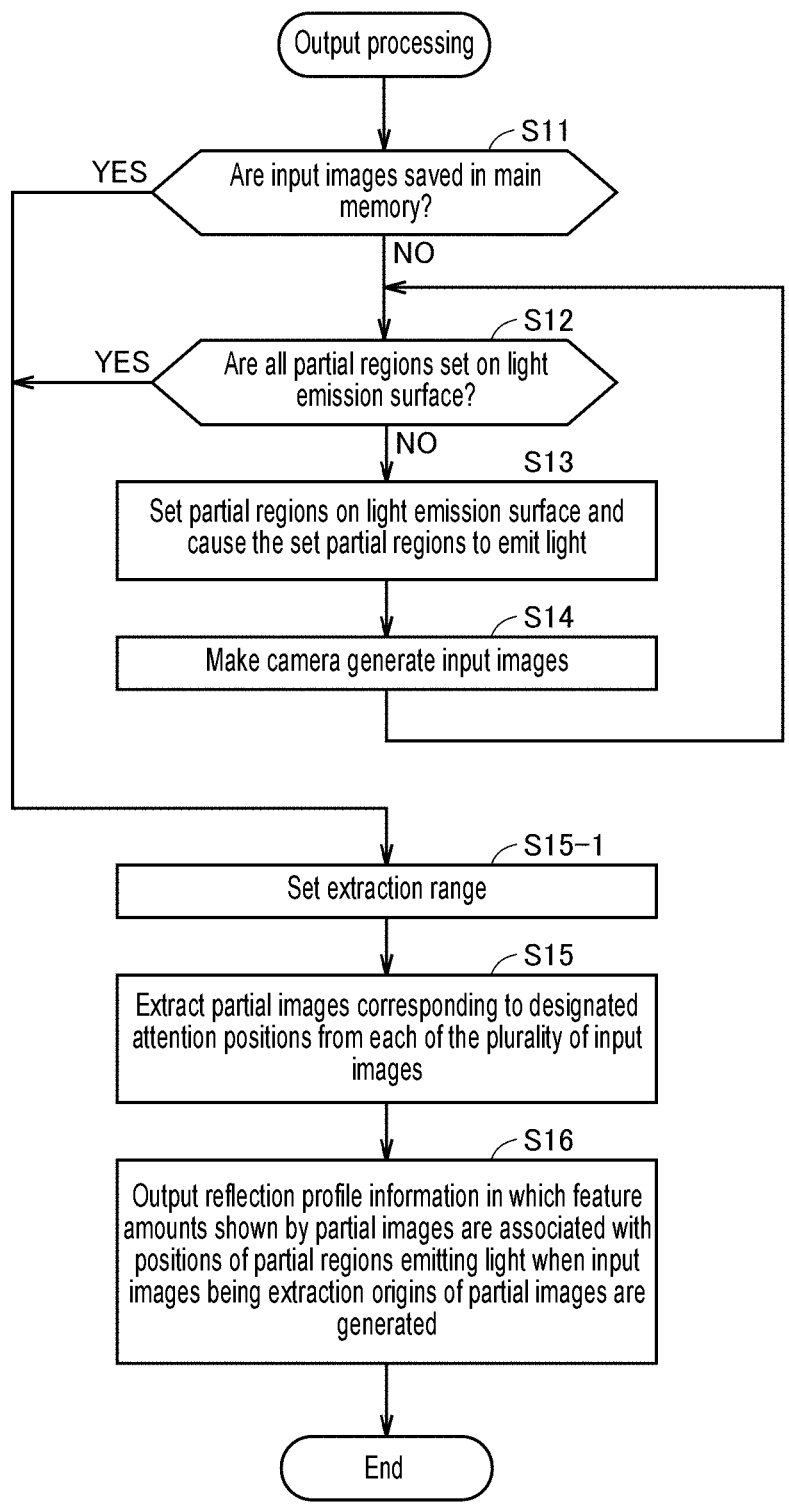
FIG. 23 is a flowchart of processing of outputting the reflection profile information in the second specific example of the designated attention position.

FIG. 23 is a flowchart of the processing of outputting the reflection profile information 74 in the second specific example of the designated attention position a. The flowchart shown in FIG. 23 is different from the flowchart shown in FIG. 14 in that step S15-1 is arranged.

In step S15-1, the CPU 110 sets the extraction range. The CPU 110 designates a predefined range as the extraction range with the positions on the light emission surface 40 corresponding to the designated attention positions a as the reference position. In the following, in step S15, the partial images M are extracted in accordance with the extraction range designated in step S15-1.

F. Variation Example of Position Relationship Among Illumination Device, Camera and Object In the embodiment, the example in which the illumination device 4 is disposed between the camera 8 and the object W is shown. Besides, the position relationship among the illumination device 4, the camera 8 and the object W is not limited to be coaxial, and may be a position relationship in which the light from the illumination device 4 are irradiated to the object W and at least one portion of the object W is included in the imaging visual field 81 of the camera 8.

Figure 24:
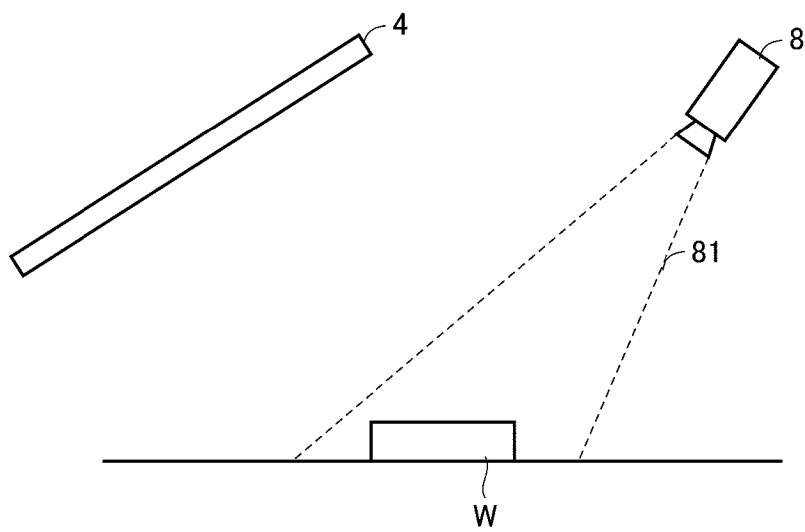
FIG. 24 is a diagram showing a variation example of a position relationship among the illumination device, a camera and an object.

FIG. 24 is a diagram showing a variation example of the position relationship among the illumination device 4, the camera 8 and the object W. For example, the illumination device 4 may not be disposed on an optical axis of the camera 8. In the example shown in FIG. 24, the illumination device 4 is not disposed on the optical axis of the camera 8, so that an illumination device without permeability can be adopted as the illumination device 4.

G. Variation Example of Illumination Device

Figure 25:
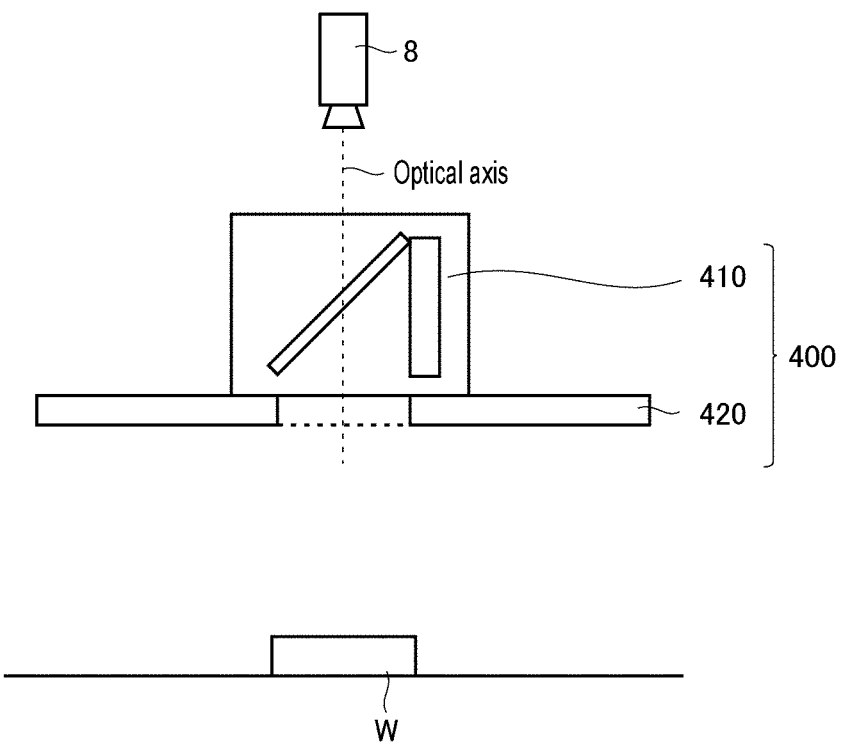
FIG. 25 is a diagram showing a variation example of the illumination device.

In the embodiment, a translucent organic EL lamp is mentioned as one example of the illumination device 4. Besides, when the illumination device 4 is disposed between the camera 8 and the object W, the illumination device 4 may have at least any one of a shape not blocking the visual field at least during the imaging and an optical characteristic not blocking the visual field. For example, the illumination device 4 may be the illumination device 4 in which an opening is arranged in one portion, the illumination device 4 in which one portion is configured by a coaxial incident illumination, or the like. FIG. 25 is a diagram showing a variation example of the illumination device. For the illumination device 400 of the variation example, one portion is configured by a coaxial incident illumination 410 and the other portion is configured by an illumination 420 without translucency.

H. Variation Example of Method for Outputting Reflection Profile Information 70

In the embodiment, as an output method of the reflection profile information 70, a method of outputting the reflection profile information 70 in which the feature amounts p are mapped to the predefined coordinate system is exemplified. However, for example, the reflection profile information 70 can also be output by an approximate formula or the like in which the relationships between the positions on the light emission surface 40 and the feature amounts p are expressed.

In addition, the mapping images are set as two-dimensional plane images, but the reflection profile information 70 can also be represented by three or more dimensions. For example, a representation form can also be used in which the feature amounts p are plotted in a coordinate system which consists of a coordinate axis showing the magnitude of the feature amounts p in addition to the coordinate axes corresponding to the positions on the light emission surface 40.

I. Output Method of Mapping Image 544 of Every Attention Position

In the second specific example, the mapping images 544 are sequentially switched as one example of the mapping images 544 obtained for each of the plurality of attention positions, but the plurality of mapping images 544 can also be overlapped and displayed.

J. Variation Example of Setting Method of Partial Regions 43

In the embodiment, each partial region 43 is set not to be overlapped with another partial region 43. Besides, each partial region 43 can also be set to be overlapped with another partial region 43 in one portion. For example, by setting each partial region 43 to be overlapped with another partial region 43, a light amount at the time of making one partial region 43 emit light can be ensured without reducing a resolution of the reflection profile information.

In addition, when the light emission intensity of each illumination element 41 can be adjusted and each partial region 43 is set to be overlapped with another partial region 43, the illumination device 4 can also make the partial regions 43 emit light in a manner that the light emission intensities of the illumination elements 41 increase from boundaries of the partial regions 43 towards centres. On this occasion, the shading pattern of the partial regions is in the form of Gaussian distribution. In this way, compared with an occasion when the partial regions 43 evenly emit light, the light amount at the time of making one partial region 43 emit light can be further increased without reducing the resolution of the reflection profile information.

K. Generation Method of Reflection Profile Information when Attention Sites a Show Prescribed Ranges In the embodiment, the attention sites A show the prescribed positions, and the attention positions a corresponding to the attention sites A are information showing one point. Besides, the attention sites A may also be information showing prescribed ranges, and on this occasion, the attention positions a may also be ranges a' showing certain ranges within the images corresponding to the prescribed ranges. On this occasion, the reflection profile information of the attention sites A may be generated, for example, based on the reflection profile information obtained for each of the plurality of attention positions a included in the range a. For example, the reflection profile information of the attention sites A may be the information in which the reflection profile information obtained for each of the plurality of attention positions a is standardized, or be the information which is expressed by a representation form in which a plurality of mapping images obtained when each reflection profile information is mapped to the ij coordinate is synthesized. In addition, the reflection profile information of the attention sites A can also be obtained by setting the ranges of the partial images M to the ranges corresponding to the ranges a.

L. Operation and Effect

As described above, both the reflection profile information 72 in the first specific example and the reflection profile information 74 in the second specific example (also referred to as the reflection profile information 70 in general hereinafter), which are output by the control device 100, are the information which shows the relationships between the positions (X, Y) within the light emission surface 40 and the feature amounts p showing the degrees of the light reflected at the attention sites A of the object W and incident to the camera 8 with respect to the light irradiated to the object W from the positions (X, Y).

Therefore, if the light is irradiated from any position on the light emission surface 40 to the object W based on the reflection profile information 70, a rough standard of how much light is incident to the camera 8 can be known, and the reflection profile information 70 becomes reference information for determining the illumination conditions. As a result, the setting of the illumination conditions becomes easy.

In addition, the feature amounts p are obtained from luminance information within the input images D which are corresponding to the attention positions a within the imaging visual field 81. In addition, the reflection profile information 74 in the second specific example is the information associated with the relative positions (i, j) with respect to the positions (the attention positions a) within the imaging visual field of the attention sites A. Therefore, regardless of the position relationships between the light emission surface 40 and the attention sites A, the reflection profile information 74 obtained for every attention site A can be compared with one another in the same dimension.

The control device 100 outputs the reflection profile information 74 to the ij coordinate system corresponding to the relative positions in a representation form of the mapping images 544 to which the feature amounts p are output. Therefore, because the reflection profile information 74 is represented by the same coordinate system regardless of the position relationships between the light emission surface 40 and the attention sites A, the reflection profile information 74 can be easily compared when compared for every attention site A.

The attention positions a can be designated for the object W displayed in the image display region 620, and the mapping images 544 of the designated attention positions a are displayed in the edition region 630 or the edition region 730. Therefore, the user can easily grasp the mapping image 544 is related to which attention site A of the position within the imaging visual field 81.

As shown in FIG. 21(a) to FIG. 21(d), the user can set a plurality of attention positions a for the images of the object W which are displayed in the image display region 620, and can sequentially display the mapping images of the plurality of attention positions a that is set in the edition region. Accordingly, the mapping images for every attention position a can be compared easily. Besides, in the example shown in FIG. 21(a) to FIG. 21(d), an example is shown in which one attention position a is selected and one mapping image 544 is displayed; however, a plurality of attention positions a may be simultaneously selected and the mapping images 544 corresponding to the plurality of attention positions a that is selected may be simultaneously or sequentially output.

The irradiation patterns L are determined based on the reflection profile information 72. Therefore, the description property to the determined illumination condition can be ensured. Besides, similarly, the description property about the reference irradiation pattern $L_0$ determined based on the reflection profile information 74 can also be ensured.

Compared with an occasion that the illumination device 4 cannot be disposed between the camera 8 and the object W, an overall compact image processing system 1 can be provided by using the illumination device 4 which can be disposed between the camera 8 and the object W as the illumination device. As a result, restriction on selection of applicable equipment can be avoided as far as possible.

M. Appendix

As described above, the embodiment includes disclosures as below.

(Configuration 1)

An image processing system including:

an imaging portion (8), which images an object (W);

a light emission portion (4, 400), which includes a light emission surface (40) directed toward the object (W);

a light emission control portion (12), which controls the light emission portion (4, 400) in a manner that each of plural types of partial regions (43) set in advance within the light emission surface (40) emits light;

an imaging control portion (14), which controls the imaging portion (8) to image in synchronization with light emission of each of the plural types of partial regions (43); and an output portion (18), which outputs reflection profile information (70, 72, 74), wherein the reflection profile information (70, 72, 74) is obtained based on a plurality of images (D) which are captured by the imaging portion (8) in synchronization with the light emission of each of the plural types of partial regions (43), and the reflection profile information (70, 72, 74) shows relationships between positions (X, Y, i, j) within the light emission surface (40) and degrees of light ($L_c$) reflected at attention sites of the object (W) and incident to the imaging portion (8) with respect to light ($L_i$) irradiated to the object (W) from the positions.

(Configuration 2)

The image processing system according to configuration 1, wherein the reflection profile information (74) is information which is obtained from each of the plurality of images (D) and which is based on luminance information (p) corresponding to attention points (a) in an imaging visual field within the images (D) and relative positions (i, j) of the partial regions (43), in which light is emitted when the images are captured with respect to the attention points (a).

(Configuration 3)

The image processing system according to configuration 2, wherein the output portion (18) outputs the reflection profile information (74) by a representation form (544) in which the information (56) corresponding to the luminance information is output to a coordinate system with two or more axes corresponding to the relative positions (i, j).

(Configuration 4)

The image processing system according to configuration 3, wherein the output portion (18) outputs the reflection profile information (74) by the representation form (544, 730), wherein the reflection profile information (74) corresponds to the attention points (a) that are determined based on the position information on images (620) which are designated by a user with respect to the images (620) of the imaging visual field (81) captured by the imaging portion (8).

(Configuration 5)

The image processing system according to configuration 3 or 4, wherein the output portion (18) simultaneously or sequentially outputs the reflection profile information (74) obtained for a plurality of attention points (a) within the imaging visual field (81) to the coordinate system (i, j) (730).

(Configuration 6)

The image processing system according to any one of configurations 1 to 5, further including a determination portion (13) which determines light emission conditions (L) of the light emission portion (4, 400) using the reflection profile information (72, 74).

(Configuration 7)

The image processing system according to any one of configurations 1 to 6, wherein the light emission portion (4, 400) is disposed between the imaging portion and the object, and has at least any one of a shape not blocking a visual field at the time of imaging and an optical characteristic not blocking the visual field.

(Configuration 8)

An image processing device (100), which controls an imaging portion (8) imaging an object (W) and a light emission portion (4, 400) having a light emission surface (40) directed toward the object (W) to perform an image processing, including:

a light emission control portion (12), which controls the light emission portion (4, 400) in a manner that each of plural types of partial regions (43) set in advance in the light emission surface (40) emits light;

an imaging control portion (14), which controls the imaging portion (8) to image in synchronization with light emission of each of the plural types of partial regions (43); and an output portion (18), which outputs reflection profile information (70, 72, 74), wherein the reflection profile information (70, 72, 74) is obtained based on a plurality of images (D) which are captured by the imaging portion (8) in synchronization with the light emission of each of the plural types of partial regions (43), and the reflection profile information (70, 72, 74) shows relationships between positions (X, Y, i, j) within the light emission surface (40) and degrees of light ($L_c$) reflected at attention sites (A) of the object (W) and incident to the imaging portion (8) with respect to light ($L_i$) irradiated to the object (W) from the positions.

(Configuration 9)

An image processing program (134), which is executed in an image processing device (100) that controls an imaging portion (8) imaging an object (W) and a light emission portion (4, 400) having a light emission surface (40) directed toward the object (W) to perform an image processing, the image processing program (134) including:

a step (S13), in which the light emission portion (4, 400) is controlled in a manner that each of plural types of partial regions (43) set in advance in the light emission surface (40) emit light;

a step (S14), in which the imaging portion (8) is controlled to image in synchronization with light emission of each of the plural types of partial regions (43); and a step (S16), in which reflection profile information (70, 72, 74) is output, wherein the reflection profile information (70, 72, 74) is obtained based on a plurality of images (D) which are captured by the imaging portion (8) in synchronization with the light emission of each of the plural types of partial regions (43), and the reflection profile information (70, 72, 74) shows relationships between positions (X, Y, i, j) within the light emission surface (40) and degrees of light ($L_c$) reflected at attention sites of the object (W) and incident to the imaging portion (8) with respect to light ($L_i$) irradiated to the object (W) from the positions.

(Configuration 10)
An image processing system, including:
an imaging portion (8), which images an object (W);
a light emission portion (4), which is disposed between the imaging portion (8) and the object (W), and has a light emission surface (40) directed toward the object (W);
a light emission control portion (12), which controls the light emission portion (4) to make unit partial regions (43) with predefined sizes sequentially be set in different positions (X, Y) on the light emission surface (40) to emit light;
an imaging control portion (14), which controls the imaging portion to sequentially generate, corresponding to the sequential light emission of the unit partial region (43), input images (D) which are images of an imaging visual field;
an extraction portion (16), which extracts, corresponding to designation of attention positions (a) with respect to the imaging visual field, partial images (M) which are corresponding to the attention positions (a) from at least one portion of the input images (D) sequentially generated; and
an output portion (18), which associates feature amounts (P) that are shown by the partial images (M) extracted by the extraction portion (16) with positions (X, Y) of the unit partial regions (43) which emit light when the input images (D) being extraction origins of the partial images (M) are generated and outputs the feature amounts (P).

(Configuration 11)
The image processing system according to configuration 10, wherein the feature amounts (P) are values showing intensities of light reflected at the attention positions (a) and incident to the imaging portion among light incident to the attention positions (a) from the light unit partial regions (43) set on the emission surface (40).

(Configuration 12)
The image processing system according to configuration 10 or 11, further including a display portion (102),
wherein the output portion (18) makes first images (542, 544) displayed in the display portion (102), and in the first images (542, 544), the positions (X, Y) of corresponding unit partial regions (43) on a first coordinate system (XY, ij) showing the light emission surface (40) are represented by a display form in accordance with the magnitude of the feature amounts (P) corresponding to the positions of the unit partial regions (43).

(Configuration 13)
The image processing system according to configuration 12, further including:
an input portion (104), which receives, in the first coordinate system (XY, ij) displayed in the display portion (102), designation of light emission intensities for every position on the light emission surface (40); and
a determination portion (13), which determines the irradiation patterns (L) used in image measurement of the object (W) corresponding to the designation of the input portion (104).

(Configuration 14)
The image processing system according to configuration 13, wherein the output portion (18) reflects the designation of the input portion (104) to the first images (542, 544).

(Configuration 15)
The image processing system according to configuration 13 or 14, wherein the images (620) of the imaging visual field which are captured by the imaging portion (8) are displayed in the display portion (102);
the input portion (104) receives user designations (622, 662) with respect to the images (620) of the imaging visual field which are displayed in the display portion (102); and
the extraction portion (16) prescribes the attention positions (a) based on the user designations (622, 662) received by the input portion.

(Configuration 16)
The image processing system according to configuration 15, wherein the images (620) of the imaging visual field captured by the imaging portion and the first images (542, 544) are displayed side by side.

(Configuration 17)
The image processing system according to any one of configurations 13 to 16,
wherein the determination portion (13) determines the irradiation patterns (L) in association with the designated attention positions (a), and
an imaging measurement portion (15) is further included which performs the image measurement of the region including the attention positions (a) based on images (53) of the attention positions (a) corresponding to the irradiation patterns (L), which are generated by the imaging portion (8) when the light emission surface (40) emits light by the irradiation patterns (L) determined by the determination portion (13).

(Configuration 18)
The image processing system according to any one of configurations 13 to 16,
wherein the light emission portion (4) makes the light emission region shown by the irradiation pattern ($L_0$) determined by the determination portion (13) sequentially set in different positions on the light emission surface (40) and emit light, and the imaging portion (8) sequentially generates the images (53) corresponding to the positions (x, y) within the imaging visual field, which have correspondence relationships with the positions on the light emission surface (40) which are set corresponding to the sequential light emission of the light emission region (8), and
an imaging measurement portion (15a) is further included which performs the image measurement of the object based on a plurality of images generated by the imaging portion (8) corresponding to the sequential light emission of the light emission region.

(Configuration 19)
The image processing system according to configuration 18, wherein the extraction portion (16) extracts the partial images (M) from the input images (D), which are generated when the unit partial region emits light, and the unit partial region are set in a position included within a predefined range ($X_r-w \leq X \leq X_r+w$, $Y_r-w \leq Y \leq Y_r+w$) which takes the position ($X_r$, $Y_r$) on the light emission surface having correspondence relationship with the designated attention position ($a_r$) as a reference position.

It should be considered that the embodiment disclosed here is illustrative instead of limitative in all aspects. The scope of the disclosure is shown by the claims instead of the description above and meanings equivalent to the claims and all modifications within the scope are intended to be included in the scope of the disclosure. In addition, the disclosures described in the embodiments and each variation example are intended to be performed individually or in combination wherever possible.

What is claimed is:
1. An image processing system, comprising:
an imaging portion, which images an object;
a light emission portion, which comprises a light emission surface directed toward the object;

a light emission control portion, which controls the light emission portion in a manner that each of plural types of partial regions set in advance in the light emission surface emits light;

an imaging control portion, which controls the imaging portion to image in synchronization with light emission of each of the plural types of partial regions; and an output portion, which outputs reflection profile information, wherein the reflection profile information is obtained based on a plurality of images which are captured by the imaging portion in synchronization with the light emission of each of the plural types of partial regions, and the reflection profile information shows relationships between positions within the light emission surface and degrees of light reflected at attention sites of the object and incident to the imaging portion with respect to the light irradiated to the object from the positions, wherein the light emission portion is disposed between the imaging portion and the object, and has at least one of a shape not blocking a visual field at the time of imaging and an optical characteristic not blocking the visual field.

2. The image processing system according to claim 1, wherein the reflection profile information is information which is obtained from each of the plurality of images and which is based on luminance information corresponding to attention points of an imaging visual field in the images and relative positions of the partial regions in which the light is emitted when the images are captured with respect to the attention points.

3. The image processing system according to claim 2, wherein the output portion outputs the reflection profile information by a representation form in which the information corresponding to the luminance information is output to a coordinate system with two or more axes corresponding to the relative positions.

4. The image processing system according to claim 3, wherein the output portion determines the attention points based on the position information on the images which are designated by a user with respect to the images of the imaging visual field captured by the imaging portion, and outputs the reflection profile information corresponding to the determined attention points by the representation form.

5. The image processing system according to claim 4, wherein the output portion simultaneously or sequentially outputs the reflection profile information obtained for each of a plurality of attention points within the imaging visual field to the coordinate system.

6. The image processing system according to claim 5, further comprising a determination portion which determines light emission conditions of the light emission portion using the reflection profile information.

7. The image processing system according to claim 4, further comprising a determination portion which determines light emission conditions of the light emission portion using the reflection profile information.

8. The image processing system according to claim 3, wherein the output portion simultaneously or sequentially outputs the reflection profile information obtained for each of a plurality of attention points within the imaging visual field to the coordinate system.

9. The image processing system according to claim 8, further comprising a determination portion which determines light emission conditions of the light emission portion using the reflection profile information.

10. The image processing system according to claim 3, further comprising a determination portion which determines light emission conditions of the light emission portion using the reflection profile information.

11. The image processing system according to claim 2, further comprising a determination portion which determines light emission conditions of the light emission portion using the reflection profile information.

12. The image processing system according to claim 1, further comprising a determination portion which determines light emission conditions of the light emission portion using the reflection profile information.

13. An image processing device, which controls an imaging portion imaging an object and a light emission portion having a light emission surface directed toward the object to perform an image processing, comprising:
   a light emission control portion, which controls the light emission portion in a manner that each of plural types of partial regions set in advance in the light emission surface emits light;
   an imaging control portion, which controls the imaging portion to image in synchronization with light emission of each of the plural types of partial regions; and
   an output portion, which outputs reflection profile information, wherein the reflection profile information is obtained based on a plurality of images which are captured by the imaging portion in synchronization with the light emission of each of the plural types of partial regions, and the reflection profile information shows relationships between positions within the light emission surface and degrees of light reflected at attention sites of the object and incident to the imaging portion with respect to the light irradiated to the object from the positions,
   wherein the light emission portion is disposed between the imaging portion and the object, and has at least one of a shape not blocking a visual field at the time of imaging and an optical characteristic not blocking the visual field.

14. An image processing program, which is executed in an image processing device that controls an imaging portion imaging an object and a light emission portion having a light emission surface directed toward the object to perform an image processing, the image processing program comprising:
   controlling the light emission portion in a manner that each of plural types of partial regions set in advance in the light emission surface emits light;
   controlling the imaging portion to image in synchronization with light emission of each of the plural types of partial regions; and
   outputting reflection profile information, wherein the reflection profile information is obtained based on a plurality of images which are captured by the imaging portion in synchronization with the light emission of each of the plural types of partial regions, and the reflection profile information shows relationships between positions within the light emission surface and degrees of light reflected at attention sites of the object and incident to the imaging portion with respect to the light irradiated to the object from the positions,
   wherein the light emission portion is disposed between the imaging portion and the object, and has at least one of a shape not blocking a visual field at the time of imaging and an optical characteristic not blocking the visual field.

* * * * *